United States Patent
Shibata et al.

(10) Patent No.: US 8,012,060 B2
(45) Date of Patent: Sep. 6, 2011

(54) SPEED CHANGE CONTROL SYSTEM FOR AUTOMATIC TRANSMISSION

(75) Inventors: Hiroyuki Shibata, Toyota (JP); Tooru Matsubara, Toyota (JP); Atsushi Tabata, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 776 days.

(21) Appl. No.: 12/090,382

(22) PCT Filed: Oct. 26, 2006

(86) PCT No.: PCT/JP2006/321348
§ 371 (c)(1),
(2), (4) Date: Apr. 16, 2008

(87) PCT Pub. No.: WO2007/049685
PCT Pub. Date: May 3, 2007

(65) Prior Publication Data
US 2009/0229393 A1 Sep. 17, 2009

(30) Foreign Application Priority Data
Oct. 26, 2005 (JP) ................................ 2005-312068

(51) Int. Cl.
*B60W 10/10* (2006.01)
(52) U.S. Cl. .............................................. 477/3; 477/8
(58) Field of Classification Search .................. 477/3, 5, 477/7, 8
See application file for complete search history.

(56) References Cited

U.S. PATENT DOCUMENTS

| 5,628,705 A | * | 5/1997 | Kashiwabara | ................. 477/46 |
| 5,979,258 A | * | 11/1999 | Nakano | ....................... 74/336 R |
| 2006/0166784 A1 | | 7/2006 | Tabata et al. | |
| 2009/0118095 A1 | * | 5/2009 | Tabata et al. | .................. 477/118 |
| 2009/0236159 A1 | * | 9/2009 | Shibata et al. | ........... 180/65.235 |

FOREIGN PATENT DOCUMENTS

| JP | 3 194255 | 8/1991 |
| JP | 5 322017 | 12/1993 |
| JP | 2003 127681 | 5/2003 |
| JP | 2005 240917 | 9/2005 |
| JP | 2005 256883 | 9/2005 |

OTHER PUBLICATIONS

Office Action issued Sep. 20, 2010, in German Patent Application No. 11 2006 002 847.2-14.

* cited by examiner

*Primary Examiner* — Ha D. Ho
(74) *Attorney, Agent, or Firm* — Oblon, Spivak, McClelland, Maier & Neustadt, L.L.P.

(57) ABSTRACT

To provide a speed change control system capable of carrying out an entire speed change operation of a transmission in which speed change operation of a first and a second speed change units are carried out simultaneously in directions opposite to each other, without deteriorating shocks even in case a speed change operation of one of the speed change units is restricted.

For this purpose, there is provided a speed change control system for an automatic transmission, which has a first and a second speed change units, and in which a speed change ratio of the second speed change unit is changed in a direction opposite to a changing direction of a speed change ratio of the first speed change unit when changing the speed change ratio of the first speed change unit, comprising: a speed changing rate setting means for setting a speed changing rate of the second speed change unit in accordance with a progression of a speed change operation of the first speed change unit.

36 Claims, 12 Drawing Sheets

Fig. 4

| | C1 | C2 | B1 | B2 | B3 | Speed Change Ratio | Step |
|---|---|---|---|---|---|---|---|
| 1st | O | | | | O | 3.357 | 1.54 |
| 2nd | O | | | O | | 2.180 | 1.53 |
| 3rd | O | | O | | | 1.424 | 1.42 |
| 4th | O | O | | | | 1.000 | 1.42 |
| 5th | O | O | | | | 0.705 | Total 4.76 |
| R | | O | | | O | 3.209 | |
| N | | | | | | | |

O Engagement

|     | C1 | C2 | B1 | B2 | Speed Change Ratio | Step |
|-----|----|----|----|----|--------------------|------|
| 1st | O  |    |    | O  | 2.804              | 1.54 |
| 2nd | O  |    | O  |    | 1.531              | 1.53 |
| 3rd | O  | O  |    |    | 1.000              | 1.42 |
| 4th | O  | O  |    |    | 0.705              | Total 3.977 |
| R   |    | O  |    | O  | 2.393              |      |
| N   |    |    |    |    |                    |      |

O Engagement

SPEED CHANGE CONTROL SYSTEM FOR AUTOMATIC TRANSMISSION

TECHNICAL FIELD

This invention relates to a speed change control system for an automatic transmission comprising a plurality of speed change units capable of setting a speed change ratio or a gear stage independently, and more specifically, to a speed change control system carrying out speed change operations of each speed change unit simultaneously, and changing the speed change ratio and the gear stage of each speed change unit in opposite directions, in case of changing a total speed change ratio.

BACKGROUND ART

One example of a drive unit for a hybrid vehicle in which a plurality of the speed change units are connected in tandem is disclosed in Japanese Patent Laid-Open No. 2003-127681. According to the system disclosed in Japanese Patent Laid-Open No. 2003-127681, an internal combustion engine is connected with a carrier of a planetary gear mechanism, and a first motor/generator is connected with a sun gear of the planetary gear mechanism. Also, a ring gear is connected with a member of an input side of a transmission. The transmission is a geared transmission such as an automatic transmission. A member of an output side of the transmission is connected with a propeller shaft, and a second motor/generator is connected with the propeller shaft. Thus, according to this drive unit for a hybrid vehicle, the planetary gear mechanism functions as a distribution mechanism distributing an engine power to the first motor/generator and to the transmission. That is, a revolution frequency of the ring gear, i.e., an input revolution of the transmission connected with the ring gear is varied continuously by changing a revolution frequency of the first motor/generator. Therefore, the planetary gear mechanism and the first motor/generator function as a continuously variable transmission. Consequently, a total speed change ratio of the drive unit for the hybrid vehicle is determined by the speed change ratio of the planetary gear mechanism functioning as a continuously variable transmission and the gear stage of the transmission arranged on the output side of the planetary gear mechanism.

According to the drive unit disclosed in Japanese Patent Laid-Open No. 2003-127681, since the engine revolution can be varied continuously by changing the revolution frequency of the first motor/generator, the engine revolution is controlled to a revolution frequency where the fuel economy is optimum utilizing this function. In this case, the engine revolution and a drive torque are varied continuously. On the other hand, if a shifting operation of the automatic transmission is carried out, the gear stage thereof is changed discontinuously (i.e., stepwise). For this reason, if the speed change operation is carried out only by the automatic transmission, changes in the engine revolution and the drive torque have to be too abrupt so that a passenger in the vehicle may feel uncomfortable feeling. In order to avoid or minimize such a problem, it is conceivable to vary the speed change ratio of the distribution mechanism (i.e., the planetary gear mechanism) in the direction opposite to the direction of the shifting operation of the automatic transmission when carrying out a shifting operation of the automatic transmission.

On the other hand, the continuously variable transmission composed mainly of the distribution mechanism or the planetary gear mechanism is adapted to carry out a speed change operation by operating the first motor/generator as a generator or an electric motor to change the revolution frequency thereof. Therefore, if an electric power generated by the first motor/generator cannot be accepted by an electric storage device or the like, or if the electric storage device cannot supply electric power to the first motor/generator sufficiently, a speed change operation of the continuously variable transmission cannot be carried out as desired.

Thus, a speed change operation of one of the speed change units such as the continuously variable transmission may be restricted for some reason. As a result, a control of coordinating speed change operations of the plurality of speed change units may be interrupted and this may cause shift shocks.

DISCLOSURE OF THE INVENTION

The present invention has been conceived noting the technical problems thus far described, and its object is to provide a control system capable of carrying out a speed change operation of an entire transmission smoothly even if there is a restriction on one of a plurality of speed change units e.g., a restriction on a speed changing rate and so on.

In order to achieve the above-mentioned object, according to the present invention, there is provided a speed change control system for an automatic transmission, which has a first speed change unit and a second speed change unit, and in which a total speed change ratio thereof is varied by changing speed change ratios of the first and the second speed change units in directions opposite to each other, comprising: a speed changing rate setting means for setting a speed changing rate of the second speed change unit in accordance with a progression of a speed change operation of the first speed change unit.

Also, according to the present invention, there is provided a speed change control system for an automatic transmission, which has a first speed change unit having a rotary member in which a revolution frequency thereof is changed in consequence of a speed change operation and a second speed change unit, and in which a total speed change ratio thereof is varied by changing speed change ratios of the first and the second speed change units in directions opposite to each other, comprising: a speed changing rate changing means for changing a speed changing rate of the second speed change unit in accordance with a change in the revolution frequency of the rotary member when the revolution frequency of the rotary member is changed by a speed change operation.

The first speed change unit is constructed of an electrical continuously variable transmission, in which a speed change ratio thereof is controlled electrically and varied continuously, and the second speed change unit is constructed of a geared transmission in which a gear stage thereof is changed stepwise. Those electrical continuously variable transmission and geared transmission may be connected in tandem so as to input power outputted from any one of those transmissions to the other one. Also, a total speed change ratio of the automatic transmission may be set by both of the electrical continuously variable transmission and geared transmission.

The electrical continuously variable transmission comprises an electric motor having a generating function, and a speed change ratio thereof is set in accordance with a revolution frequency of the electric motor. Also, there is provided an electric storage device feeding an electric power to the electric motor and storing an electric power generated by the electric motor. That is, the speed change control system for an automatic transmission of the invention is characterized in that the speed changing rate of the electrical continuously variable transmission is restricted by an amount of the electric power exchanged between the electric motor and the electric storage device.

In addition to above, the geared transmission comprises engagement devices to be engaged by an oil pressure to set a gear stage, and a shifting rate is controlled in accordance with an engaging pressure of the engagement devices.

The electrical continuously variable transmission may be constructed of a differential gear mechanism, and a single pinion type planetary gear mechanism may be used as the differential gear mechanism.

The geared transmission of the invention may be constructed of two or three sets of planetary gear mechanisms. Those planetary gear mechanisms may also be a single pinion type planetary gear mechanism. In case the geared transmission comprises three sets of planetary gear mechanisms: sun gears of first and second planetary gear mechanisms are connected with each other; a ring gear of the first planetary gear mechanism, a carrier of the second planetary gear mechanism and a carrier of the third planetary gear mechanism are connected and those ring gear and carriers are connected with an output member; and a ring gear of the second planetary gear mechanism and a sun gear of the third planetary gear mechanism are connected with each other. In this case, the geared transmission is provided with: a first clutch connecting the ring gear of the second planetary gear mechanism and the sun gear of the third planetary gear mechanism with the electrical continuously variable transmission selectively; a second clutch connecting the sun gears of the first and second planetary gear mechanisms with the electrical continuously variable transmission selectively; a first brake fixing the sun gears of the first and second planetary gear mechanisms selectively; a second brake fixing the carrier of the first planetary gear mechanism selectively; and a third brake fixing the ring gear of the third planetary gear mechanism selectively.

On the other hand, in case the geared transmission comprises two sets of planetary gear mechanisms: the sun gears of the first and the second planetary gear mechanisms are connected with each other; and the carrier of the first planetary gear mechanism and a ring gear of the second planetary gear mechanism are connected and those carrier and the ring gear are connected with an output member. In this case, the geared transmission is provided with: a first clutch connecting the ring gear of the first planetary gear mechanism with the electrical continuously variable transmission selectively; a second clutch connecting the sun gears of the first and second planetary gear mechanisms with the electrical continuously variable transmission selectively; a first brake fixing the sun gears of the first and second planetary gear mechanisms selectively; and a second brake fixing the carrier of the second planetary gear mechanism selectively.

In addition to above, the speed change control system for an automatic transmission of the invention further comprises a speed change control means for carrying out a normal speed change control of determining a speed change ratio, on the basis of a running condition of a vehicle on which the automatic transmission is mounted and of a speed change diagram in which the speed change ratio is set in accordance with the running condition of the vehicle.

According to the present invention, the speed change operation of the entire automatic transmission is carried out by changing the speed change ratio of the first speed change unit while changing the speed change ratio of the second speed change unit in the direction opposite to that in the first speed change unit. In this case, the speed changing rate of the second speed change unit is set in accordance with the progression of the speed change operation of the first speed change unit. Therefore, the speed change operations of individual speed change units progress cooperatively even in case the speed change operation of the first speed change unit is restricted, especially, even in case the speed changing rate of the first speed change unit is restricted. As a result, occurrence of shift shocks can be prevented or shocks can be minimized.

Also, according to the invention, the speed change operation of the entire automatic transmission is carried out by changing the speed change ratio of the first speed change unit while changing the speed change ratio of the second speed change unit in the direction opposite to that in the first speed change unit, and the speed changing rate of the second speed change unit is changed in accordance with the change in the revolution frequency of the rotary member of the first speed change unit. Therefore, the speed change operations of individual speed change units progress cooperatively even in case the speed change operation of the first speed change unit is restricted, especially, even in case the speed changing rate of the first speed change unit is restricted. As a result, occurrence of shift shocks can be prevented or shocks can be minimized.

In addition to the above-mentioned advantage, since the first speed change unit is an electrical continuously variable transmission, the present invention may also be applied to e.g., a hybrid drive unit, in which a revolution frequency of an internal combustion engine is controlled steplessly by an electric motor having a generating function, and which additionally comprises a geared transmission. Here, shift shocks can also be prevented or minimized even in this case.

Further, according to the invention, the speed change operation of the electrical continuously variable transmission constituting the first speed change unit is carried out by feeding an electric power from the electric storage device to the first electric motor, or by storing an electric power generated by the first electric motor. Therefore, the speed change operation of the second speed change unit is carried out in conformity with the speed change operation of the first speed change unit even in case the first electric motor cannot feed the electric power sufficiently, or even in case the electric storage device cannot accept the electric power generated by the first electric motor sufficiently.

Furthermore, according to the invention, shift shocks can be prevented or suppressed by controlling the engaging pressure of the second speed change unit to control the speed change operation of the second speed change unit accommodating to the speed change operation of the first speed change unit.

Additionally, according to the invention, a normal speed change control for carrying out a speed change operation by determining a speed change ratio on the basis of a running condition of the vehicle and the speed change diagram is carried out at normal running times.

BRIEF DESCRIPTION OF THE DRAWINGS

FIG. 4 is a table showing a relation between gear stages set by a geared transmission and engagement states of hydraulic frictional engagement devices.

BEST MODE FOR CARRYING OUT THE INVENTION

Figure 3:
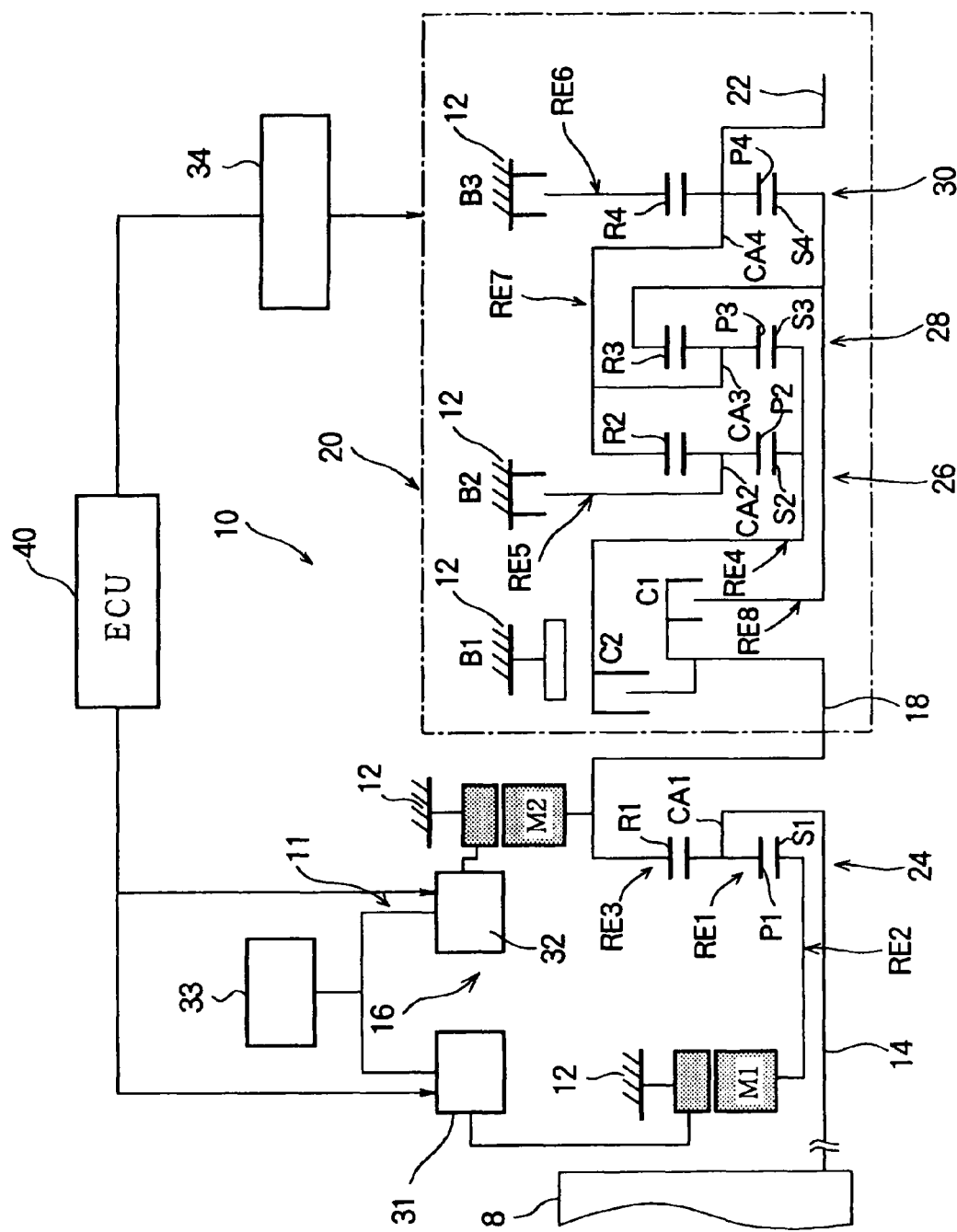
FIG. 3 is a skeleton diagram showing one example of a drive unit for a hybrid vehicle to which the invention is applied.

FIG. 3 is a skeleton diagram explaining a transmission 10 constituting a part of a drive unit of a hybrid vehicle, to which a control system as one example of the invention is applied. As illustrated in FIG. 3, the transmission 10 comprises, an input shaft 14 as an input rotary member arranged coaxially in a non-rotatable transmission case 12 (as will be called as a case 12 hereinafter) mounted on a vehicle, a continuously variable transmission unit 11 connected to the input shaft 14 directly or indirectly through a not shown pulsation absorbing damper (i.e., a vibration dampening device), a geared transmission unit 20 functioning as a geared transmission connected in tandem through a transmission member (i.e., a transmission shaft) 18 on a power transmission route between the continuously variable transmission unit 11 and a driving wheel 38, and an output shaft 22 as an output rotary member connected to the geared transmission unit 20. The above-listed elements are arranged in tandem in the transmission 10. This transmission 10 is suitable for front-engine rear-drive vehicles in which elements are arranged in tandem, and the transmission 10 is arranged between an engine as a prime mover for running and a pair of driving wheels. The prime mover is an engine 8 exemplified by a gasoline engine and a diesel engine or the like, and the engine 8 is connected directly with the input shaft 14 or indirectly through a not shown pulsation absorbing damper. Here, since the arrangement of the transmission 10 is symmetrical with respect to its axial line, a lower part thereof is omitted in the skeleton diagram of FIG. 3. The same applies to the following embodiments.

The continuously variable transmission unit (or the first speed change unit) 11 is a mechanism for mechanically distributing an output of the engine 8 inputted to the input shaft 14. The continuously variable transmission unit 11 comprises a power distribution mechanism 16 functioning as a differential mechanism for distributing the output of the engine 8 to the first electric motor M1 and to the transmission member 18, and a second electric motor M2 arranged to rotate integrally with the transmission member 18. The second electric motor M2 may be arranged any place on the power transmission route from the transmission member 18 to the driving wheel. According to this embodiment, both electric motors M1 and M2 are motor generators having a function to generate electric power. More specifically, the first electric motor M1 intrinsically has a function as a generator for generating a reaction force, and the second electric motor M2 intrinsically has a function as a motor for outputting a driving force for running the vehicle.

The power distributing mechanism 16 mainly comprises a single pinion type first planetary gear mechanism 24 the gear ratio thereof is e.g., approximately "0.418" and it is represented by "ρ1". The first planetary gear mechanism 24 comprises following rotary elements, such as a first sun gear S1, a first planetary gear P1, a first carrier CA1 holding the first planetary gear P1 in a rotatable and revolvable manner, and a first ring gear R1 meshing with the first sun gear S1 through the first planetary gear P1. The aforementioned gear ratio ρ1 is expressed as ZS1/ZR1. Here, ZS1 represents a teeth number of the first sun gear S1, and ZR1 represents a teeth number of the first ring gear R1.

In the power distribution mechanism 16, the first carrier CA1 is connected to the input shaft 14, i.e., to the engine 8, the first sun gear S1 is connected to the first electric motor M1, and the first ring gear R1 is connected to the transmission member 18. A differential action of the power distribution mechanism 16 is achieved by allowing to rotate three elements of the first planetary gear mechanism 24, i.e., to rotate the first sun gear S1, the first carrier CA1 and the first ring gear R1 relatively among each other. As a result, the output of the engine 8 is distributed to the first electric motor M1 and to the transmission member 18, and the electric energy generated by the first electric motor M1 operated by a part of the output of the engine 8 is stored or drives the second electric motor M2. In consequence, the continuously variable transmission unit 11 (or the power distribution mechanism 16) functions as an electrical differential mechanism to achieve a "continuously variable transmission state (i.e., an electrical CVT state)", so that the revolution frequency of the engine 8 is varied continuously without varying the revolution frequency of the transmission member 18. In short, when the power distribution mechanism 16 is performing the differential action, the continuously variable transmission unit 11 is also performing the differential action.

Specifically, the continuously variable transmission unit 11 functions as an electrical continuously variable transmission, in which its speed change ratio Y0 (i.e., revolution frequency of the input shaft 14/revolution frequency of the transmission member 18) is varied continuously from a minimum value Y0min to a maximum value Y0max.

The geared transmission unit (or a second transmission unit) 20 comprises a single pinion type second planetary gear mechanism 26, a single pinion type third planetary gear mechanism 28 and a single pinion type fourth planetary gear mechanism 30. The second planetary gear mechanism 26 comprises a second sun gear S2, a second planetary gear P2, a second carrier CA2 holding the second planetary gear P2 in a rotatable and revolvable manner, and a second ring gear R2 meshing with the second sun gear S2 through the second planetary gear P2. The second planetary gear mechanism 26 has a predetermined gear ratio ρ2 which is approximately "0.562". The third planetary gear mechanism 28 comprises a third sun gear S3, a third planetary gear P3, a third carrier CA3 holding the third planetary gear P3 in a rotatable and revolvable manner, and a third ring gear R3 meshing with the third sun gear S3 through the third planetary gear P3. The third planetary gear mechanism 28 has a predetermined gear ratio ρ3 which is approximately "0.425". The fourth planetary gear mechanism 30 comprises a fourth sun gear S4, a fourth planetary gear P4, a fourth carrier CA4 holding the fourth planetary gear P4 in a rotatable and revolvable manner, and a fourth ring gear R4 meshing with the fourth sun gear S4 through the fourth planetary gear P4. The fourth planetary gear mechanism 30 has a predetermined gear ratio ρ4 which is approximately "0.421". The aforementioned gear ratios ρ2 is expressed as ZS2/ZR2, ρ3 is expressed as ZS3/ZR3, and ρ4 is expressed as ZS4/ZR4. Here, ZS2 represents a teeth number of the second sun gear S2, ZR2 represents a teeth number of the second ring gear R2, ZS3 represents a teeth number of the third sun gear S3, ZR3 represents a teeth number of the third ring gear R3, ZS4 represents a teeth number of the fourth sun gear S4, and ZR4 represents a teeth number of the fourth ring gear R4.

Here will be explained a connection in the geared transmission unit 20. The second sun gear S2 and the third sun gear S3 are connected integrally with each other. Those sun gears S2 and S3 are connected selectively to the transmission member 18 through the second clutch C2, and also connected selectively to the case 12 through a first brake B1. The second carrier CA2 is connected selectively to the case 12 through a second brake B2. The fourth ring gear R4 is connected selectively to the case 12 through a third brake B3. The second ring gear R2, the third carrier CA3 and the fourth carrier CA4 are connected integrally, and those elements are connected to the output shaft 22. The third ring gear R3 and the fourth sun gear S4 are connected integrally, and those elements are connected selectively to the transmission member 18 through the first clutch C1.

The aforementioned first clutch C1, second clutch C2, first brake B1, second brake B2 and third brake B3 are hydraulic frictional engagement devices generally used in conventional automatic transmissions for a vehicle. Those hydraulic frictional engagement devices are composed mainly of a wet multiple disc clutch in which a plurality of frictional discs facing with each other are pressed by a hydraulic actuator, a band brake in which one of the end of one or two band(s) applied to an outer circumferential face of a rotating drum is (are) wound up by a hydraulic actuator, and so on. The role of the hydraulic frictional engagement device is to connect the members of both sides thereof selectively.

According to the transmission 10 thus far explained, as indicated in the table of FIG. 4, any of a first gear stage (represented as 1st in the table) to a fifth gear stage (represented as 5th in the table), a reverse gear stage (represented as R in the table), and a neutral (represented as N in the table) are achieved by selectively activating the aforementioned elements, specifically, by selectively engaging the first clutch C1, the second clutch C2, the first brake B1, the second brake B2 and the third brake B3. As a result, a speed change ratio Y (i.e., input shaft revolution NIN/output shaft revolution NOUT), which changes substantially in equal ratio at every gear stage is obtained. It is to be especially noted that the continuously variable transmission state where the transmission 10 functions as an electrical continuously variable transmission is achieved by both of the continuously variable transmission unit 11 and the geared transmission unit 20.

Here will be explained engagement statuses of the case in which the transmission 10 functions as a geared transmission by fixing the speed change ratio of the continuously variable transmission unit 11. For example, as shown in FIG. 4: the first gear stage where the maximum value of a speed change ratio Y1 is approximately "3.357" is achieved by engaging the first clutch C1 and the third brake B3; the second gear stage where a speed change ratio Y2 is smaller than the speed change ratio of the first gear stage, e.g., approximately "2.180" is achieved by engaging the first clutch C1 and the second brake B2; the third gear stage where a speed change ratio Y3 is smaller than the speed change ratio of the second gear stage, e.g., approximately "1.424" is achieved by engaging the first clutch C1 and the first brake B1; the fourth gear stage where a speed change ratio Y4 is smaller than the speed change ratio of the third gear stage, e.g., approximately "1.000" is achieved by engaging the first clutch C1 and the second clutch C2; and the fifth gear stage where a speed change ratio Y5 is smaller than the speed change ratio of the fourth gear stage, e.g., approximately "0.705" is achieved by engaging the first clutch C1 and the second clutch C2. The reverse gear stage where a speed change ratio YR is between the speed change ratios of the first and the second gear stages, e.g., "3.209" is achieved by engaging the second clutch C2 and the third brake B3. Additionally, all of the frictional engagement devices are released to achieve Neutral.

Meanwhile, in case the transmission 10 functions as a continuously variable transmission, the continuously variable transmission unit 11 functions as an electrical continuously variable transmission, and the geared transmission unit 20 arranged in tandem therewith functions as a geared transmission. As a result, the input revolution to the geared transmission unit 20, more specifically, the revolution frequency of the transmission member 18 to be inputted individually to the first to fourth gear stages of the geared transmission unit 20 is varied continuously, and the individual gear stages thereby obtain a continuous range of the speed change ratio. For this reason, the speed change ratio can be varied steplessly and continuously even between the gear stages. Consequently, a speed change ratio YT achieved by the continuously variable transmission unit 11 and the geared transmission unit 20, more specifically, a total speed change ratio YT as an entire speed change ratio of the transmission 10, which is governed by both of the speed change ratio Y0 of the continuously variable transmission unit 11 and the speed change ratio Y of the geared transmission unit 20, can be varied steplessly.

Figure 5:
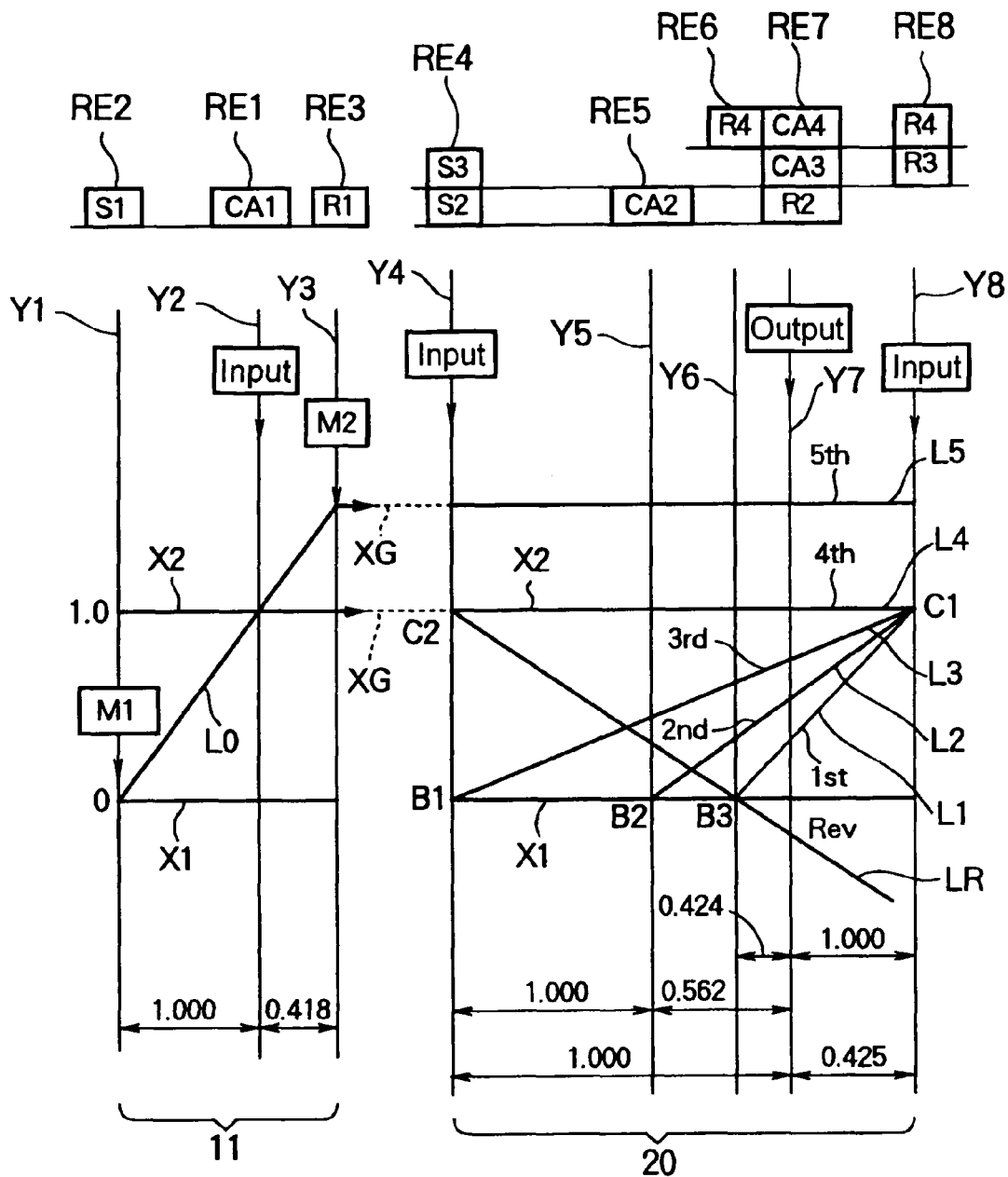
FIG. 5 is a nomographic diagram explaining operating states of individual transmissions shown in FIG. 3.

FIG. 5 is a nomographic diagram linearly indicating a relation of revolution frequencies of the rotary elements to be connected depending on the gear stage, in the transmission 10 comprising the continuously variable transmission unit 11 functioning as a differential unit or a first transmission unit, and the geared transmission unit 20 functioning as a (an automatic) transmission unit or a second transmission unit. The nomographic diagram of FIG. 5 is a two-dimensional coordinate composed of abscissa axes indicating relations of the gear ratios "ρ" of individual planetary gear mechanisms 24, 26, 28 and 30, and longitudinal axes indicating relative revolution frequencies. In the diagram, the bottom abscissa axis X1 represent "zero" revolution, and the middle abscissa axis X2 represents the revolution frequency of "1.0", i.e., a revolution frequency Ne of the engine 8 connected with the input shaft 14, and an abscissa axis XG represents a revolution frequency of the transmission member 18.

Meanwhile, three longitudinal axes Y1, Y2 and Y3 individually indicates relative revolution frequencies of three elements of the power distribution mechanism 16 of the continuously variable transmission unit 11. Specifically, Y1 indicates relative revolution frequency of the first sun gear S1 corresponding to a second rotary element (or a second element) RE2, Y2 indicates relative revolution frequency of the first carrier CA1 corresponding to a first rotary element (or a first element) RE1, and Y3 indicates relative revolution frequency of the first ring gear R1 corresponding to a third rotary element (or a third element) RE3. Clearances between those longitudinal axes Y1 to Y3 are determined individually in accordance with a gear ratio ρ1 of the first planetary gear mechanism 24. Five longitudinal axes Y4 to Y8 individually represent the rotary elements of the geared transmission unit 20. Specifically, Y4 represents the mutually connected second sun gear S2 and third sun gear S3 corresponding to a fourth rotary element (or a fourth element) RE4, Y5 represents the second carrier CA2 corresponding to a fifth rotary element (or a fifth element) RE5, Y6 represents the fourth ring gear R4 corresponding to a sixth rotary element (or a sixth element) RE6, Y7 represents the mutually connected second ring gear R2, third carrier CA3 and fourth carrier CA4 corresponding to a seventh rotary element (or a seventh element) RE7, and Y8 represents the mutually connected third ring gear R3 and fourth sun gear S4 corresponding to an eighth rotary element (or a eighth element) RE8. Clearances between those longitudinal axes Y4 to Y8 are determined individually in accordance with a gear ratios ρ2, ρ3 and ρ4 of the second to fourth planetary gear mechanisms 26, 28 and 30. Provided that the clearance between the longitudinal axes representing the sun gear and the carrier is set to "1", the clearance between the longitudinal axes representing the carrier and the ring gear indicates the gear ratio ρ of the planetary gear mechanism. Specifically, in the continuously variable transmission unit 11, the clearance between the longitudinal axes Y1 and Y2 is set to "1", and the clearance between Y2 and Y3 is set to the gear ratio ρ1. In the second to fourth planetary gear mechanisms 26, 28 and 30 of the geared transmission unit 20, also, each clearance between the sun gear and the carrier is set to "1" and each clearance between the carrier and the ring gear is set to "ρ".

As can be seen from the nomographic diagram in FIG. 5, in the power distribution mechanism 16 (or the continuously variable transmission unit 11) of the transmission 10 of this embodiment, the first rotary element RE1 (or the first carrier CA1) of the first planetary gear mechanism 24 is connected to the input shaft 14, i.e., to the engine 8, the second rotary element RE2 is connected to the first electric motor M1, and the third rotary element RE3 (or the first ring gear R1) is connected to the transmission member 18 and to the second electric motor M2. Therefore, a rotation of the input shaft 14 is transmitted (i.e., inputted) to the geared transmission unit 20 via the transmission member 18. The relation between the revolution frequencies of the first sun gear S1 and the first ring gear R1 is indicated by a slant line L0 passing through an intersection of Y2 with X2.

If the revolution frequency of the first sun gear S1 indicated at the intersection of the line L0 with the longitudinal axis Y1 is fluctuated by controlling the reaction force resulting from a generation of the first electric motor M1, the revolution frequency of the first ring gear R1 indicated at the intersection of the line L0 with the longitudinal axis Y3 is fluctuated.

On the other hand, in the geared transmission unit 20, the fourth rotary element RE4 is connected selectively to the transmission member 18 through the second clutch C2 and selectively to the case 12 through the first brake B1, the fifth rotary element RE5 is connected selectively to the case 12 through the second brake B2, the sixth rotary element RE6 is connected selectively to the case 12 through the third brake B3, the seventh rotary element RE7 is connected to the output shaft 22, and the eighth rotary element RE8 is connected selectively to the transmission member 18 through the first clutch C1.

As shown in FIG. 5, in the geared transmission unit 20, a revolution frequency of the output shaft 22 at the first gear stage is indicated at the intersection of the slant line L1 with the longitudinal axis Y7 indicating the revolution frequency of the seventh rotary element RE7 connected to the output shaft 22. Here, the line L1 is determined as a result of an engagement of the first clutch C1 and the third brake B3, and it extends from the intersection of the longitudinal axis Y6 indicating the revolution frequency of the sixth rotary element RE6 with the abscissa axis X1, to the intersection of the longitudinal axis Y8 indicating the revolution frequency of the eighth rotary element RE8 with the abscissa axis X2. As in the case of the first gear stage: a revolution frequency of the output shaft 22 at the second gear stage is indicated at the intersection of the longitudinal axis Y7 with a slant line L2 determined as a result of engaging the first clutch C1 and the second brake B2; a revolution frequency of the output shaft 22 at the third gear stage is indicated at the intersection of the longitudinal axis Y7 with a slant line L3 determined as a result of engaging the first clutch C1 and the first brake B1; and a revolution frequency of the output shaft 22 at the fourth gear stage is indicated at the intersection of the longitudinal axis Y7 with a horizontal line L4 determined as a result of engaging the first clutch C1 and the second clutch C2. At the aforementioned first to fourth gear stages, the power is inputted from the continuously variable transmission unit 11 or the power distribution mechanism 16 to the eighth rotary element RE8 at the revolution frequency identical to the revolution frequency Ne of the engine 8 by controlling the revolution frequency of the first electric motor M1. On the other hand, in case the first sun gear S1 is fixed by halting the rotation of the first electric motor M1, the power from the continuously variable transmission unit 11 is inputted at the revolution frequency higher than the revolution frequency NE of the engine 8. Therefore, a revolution frequency of the output shaft 22 at the fifth gear stage is indicated at the intersection of the longitudinal axis Y7 with a horizontal line L5 determined as a result of engaging the first clutch C1 and the second clutch C2.

In order to control the first electric motor M1, there is provided a first controller 31. Also, in order to control the second electric motor M2, there is provided a second controller 32. Those controllers 31 and 32 are composed mainly of an inverter, for example. The roles of those controllers 31 and 32 are to operate the individual electric motors M1 and M2 as electric motors or generators, and to control the revolution frequencies and the torques thereof depending on the situation. The electric motors M1 and M2 are individually connected with an electric storage device 33 through the controllers 31 and 32. The electric storage device 33 feeds electric power to the electric motors M1 and M2, and stores the electric power generated by the electric motors M1 and M2 in case those electric motors M1 and M2 function as generators. The electric storage device 33 is composed mainly of a secondary battery and a capacitor.

Also, in order to control engaging pressure and releasing pressure for the aforementioned clutches and brakes, there is provided a hydraulic control unit 34. The functions of the hydraulic control unit 34 are to regulate oil pressure established by an (not shown) oil pump to a line pressure, to control the engaging pressure of the individual frictional engagement devices based on the line pressure as an initial pressure, and to control the releasing pressure to release the frictional engagement devices. Specifically, known hydraulic control units used in automatic transmissions may be employed as the hydraulic control unit 34.

Figure 6:
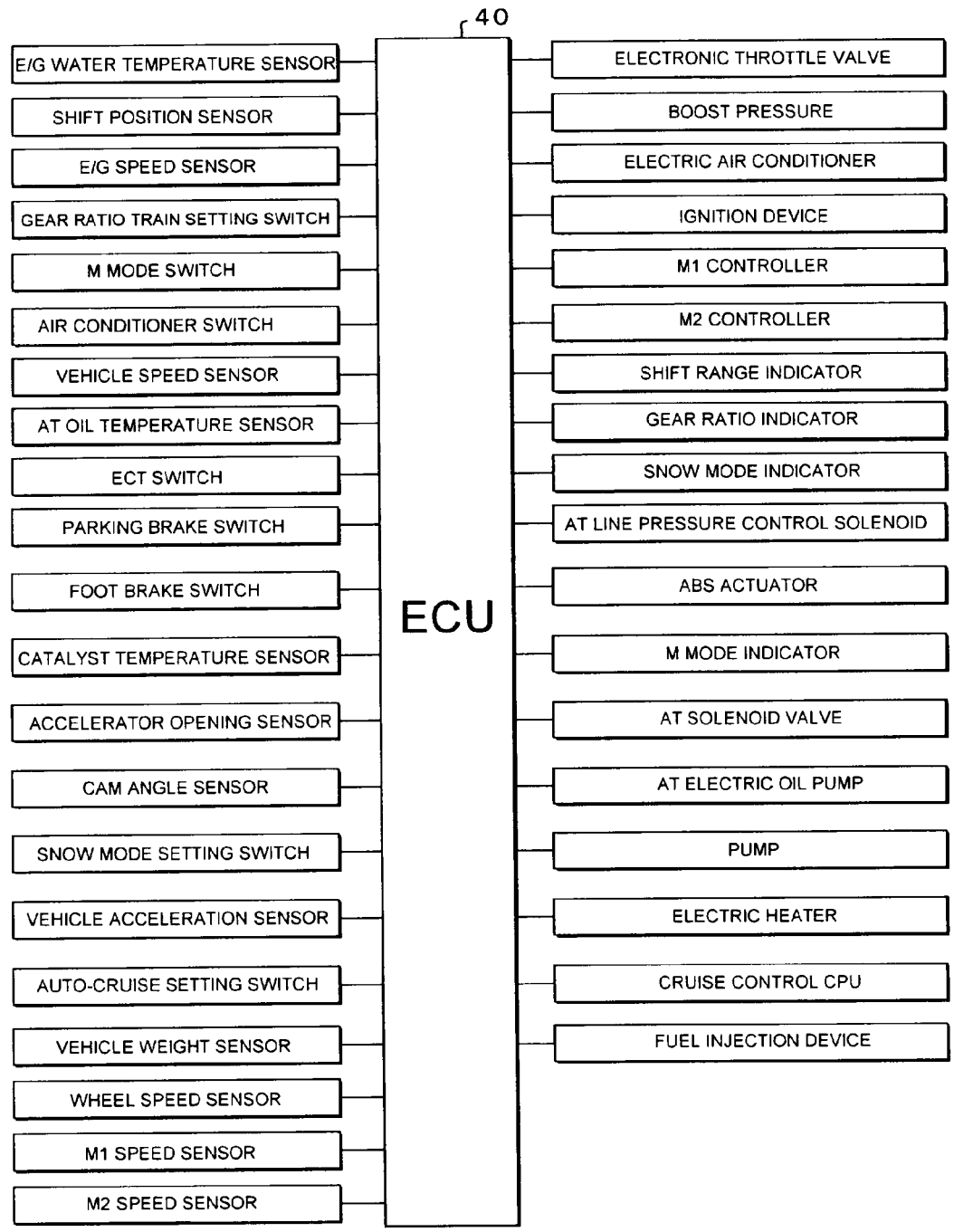
FIG. 6 is a diagram showing an example of input signals and output signals of an electronic control unit.

Further, there is provided an electronic control unit (ECU) 40 for controlling the transmission 10 entirely by controlling the aforementioned controllers 31 and 32, and the hydraulic control unit 34 by electronic signals. The signals inputted to the electronic control unit 40, and the signals outputted form the electronic control unit 40 are indicated in FIG. 6. The electronic control unit 40 comprises a microcomputer composed mainly of CPU, ROM, RAM and an input/output interface and so on. The electronic control unit 40 carries out drive controls, e.g., a hybrid drive control of the engine 8 and the first and the second electric motors M1 and M2, and a shift control of the geared transmission unit 20, by carrying out a signal process in accordance with a program stored in ROM in advance while utilizing a temporal storage function of RAM.

As shown in FIG. 6, a signal indicating a water temperature of the engine, a signal indicating a shift position, a signal indicating the revolution frequency Ne of the engine 8, a signal indicating the gear ratio train setting value, a signal instructing M mode (i.e., a motor running mode), a signal indicating an operation of an air-conditioner, a signal indicating a vehicle speed corresponding to the revolution frequency NOUT of the output shaft 22, a signal indicating an oil temperature of an operating oil (i.e., an AT oil temperature) of the geared transmission unit 20, a signal indicating an operation of a parking brake, a signal indicating an operation of a foot brake, a signal indicating a temperature of a catalyst, an accelerator opening signal indicating a stepping amount of the accelerator corresponding to an output demand of the driver, a cam angle signal, a signal indicating a snow mode setting, an acceleration signal indicating a longitudinal acceleration of the vehicle, a signal indicating an auto-cruise running, a signal indicating a weight of the vehicle, a signal indicating a speed of individual wheels, a signal indicating a revolution frequency of the first electric motor M1 (as will be called a "revolution frequency of the first electric motor" hereinafter), a signal indicating a revolution frequency of the second electric motor M2 (as will be called a "revolution frequency of the second electric motor" hereinafter) and so on, are inputted to the electronic control unit 40.

On the other hand, a driving signal to a throttle actuator for controlling an opening of an electronic throttle valve, a fuel feeding signal for controlling a feeding amount of the fuel from a fuel injection device to the engine 8, a boost regulating signal for regulating a boost pressure, a signal for activating the electric air-conditioner, an ignition signal for commanding a timing to ignite the engine 8 by an ignition device, a command signal for commanding an operation of the electric motors M1 and M2, a shift position (or an operating position) indicating signal for activating a shift indicator, a signal indicating a gear ratio, a signal indicating a snow mode, a signal for activating an ABS actuator for preventing a slippage of the wheel at a braking time, an M mode indication signal indicating that M mode is selected, a valve command signal for activating a solenoid valve of the hydraulic control unit 34 so as to control the hydraulic actuator of the hydraulic frictional engagement devices of the geared transmission unit 20, a drive command signal for activating an electric hydraulic pump as a hydraulic source of the hydraulic control unit 34, a signal for activating an electric heater, a signal to a computer for carrying out a cruise control and so on, are outputted from the electronic control unit 40.

Figure 7:
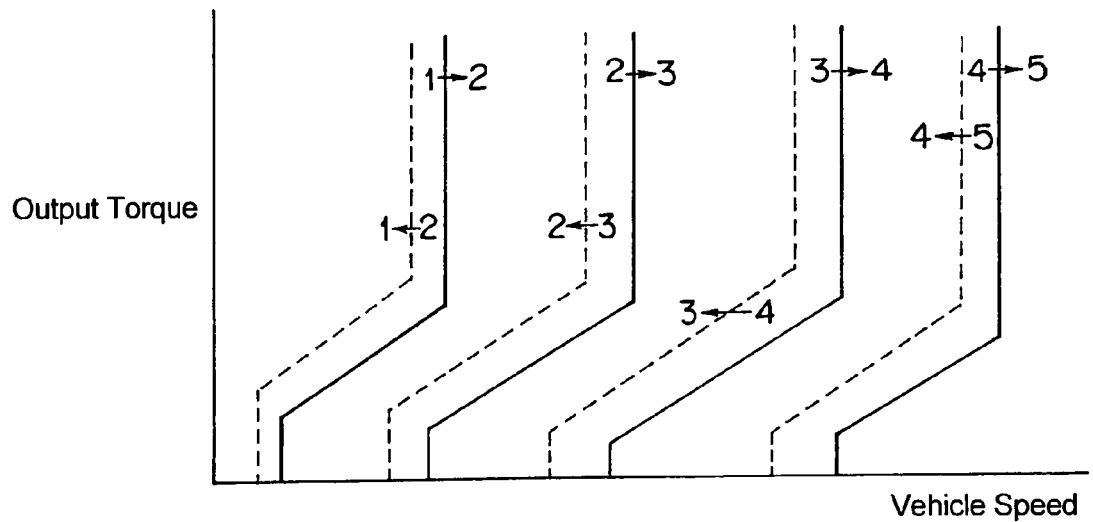
FIG. 7 is a diagram schematically showing one example of a speed change diagram of the geared transmission.

FIG. 7 shows a shifting diagram used for a shifting control of the geared transmission unit 20. In FIG. 7, an abscissa axis represents a vehicle speed and a longitudinal axis represents an output torque demand, and gear stage regions are defined using the vehicle speed and the output demand as parameters. Also, in FIG. 7, solid lines are upshift lines as boundaries of the individual gear stage regions for the case of upshifting, and broken lines are downshift lines as boundaries of the individual gear stage regions for the case of downshifting.

Figure 8:
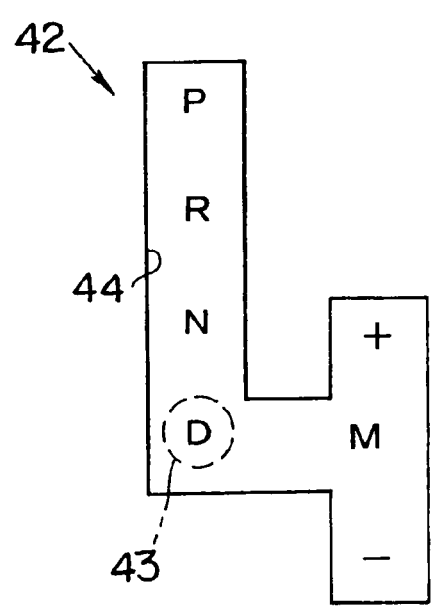
FIG. 8 is a diagram showing one example of an arrangement of a shift position of a shifting device.

All of those gear stages can be established in case a Drive range (i.e., drive position) is selected, however, the gear stages of high speed side are restricted under a manual shifting mode (i.e., manual mode). FIG. 8 illustrates an arrangement of shift positions in a shifting device 42 for outputting a shift position signal to the aforementioned electronic control unit 40. In the shifting device 42, a Parking (P) for keeping the vehicle being stopped, a Reverse (R), a Neutral (N) and a Drive (D) positions are arranged linearly in an anteroposterior direction of the vehicle. A Manual position (M) is arranged adjacent to the Drive position (D) in the width direction of the vehicle, and an upshift position (+) and a downshift position (−) are arranged above and below the manual position. Those shift positions are connected through a guide groove 44 guiding a shift lever 43. Therefore, the shift position is selected arbitrary by moving the shift lever 43 along the guide groove 44, and the shift position signal of selected position is inputted to the electronic control unit 40.

In case the Drive position is selected, all of the forward stages of the geared transmission unit 20 from the first to fifth stages can be set depending on a running condition. On the other hand, in case the shift lever 43 is moved from the Drive position to the Manual position, the Drive position is maintained and a shifting can be made up to the fifth stage. However, in this case, a downshift signal (i.e., a down range signal) is outputted each time the shift lever 43 is moved to the downshift position. As a result, the gear stage is shifted sequentially to a 4th range where the fifth stage is inhibited, a 3rd range where the fourth or higher stages are inhibited, a 2nd range where the third or higher stages are inhibited, and an L range where the gear stage is fixed to the first stage. To the contrary, an upshift signal is outputted each time the shift lever 43 is moved to the upshift position, so that the gear stage is shifted sequentially to the higher range.

According to the transmission 10, an entire speed change ratio, i.e., a total speed change ratio thereof is governed by a product of the speed change ratio set in the continuously variable transmission unit 11 and the gear stage set in the geared transmission unit 20. The total speed change ratio of the transmission 10 can be varied by changing the speed change ratio of the continuously variable transmission unit 11. That is, the total speed change ratio of the transmission 10 can be varied continuously. On the other hand, the gear stage of the geared transmission unit 20 changes stepwise. Therefore, if the total speed change ratio is changed only by a shifting operation of the geared transmission unit 20, the revolution frequency Ne of the engine 8 and the drive torque change abruptly. As a result, shocks may be amplified. In order to avoid such a disadvantage, a speed change operation of the continuously variable transmission unit 11 is carried out cooperatively with a shifting operation of the geared transmission unit 20 so as to vary the total speed change ratio continuously or smoothly. The aforementioned cooperative speed change is schematically shown in FIG. 9.

Figure 9:
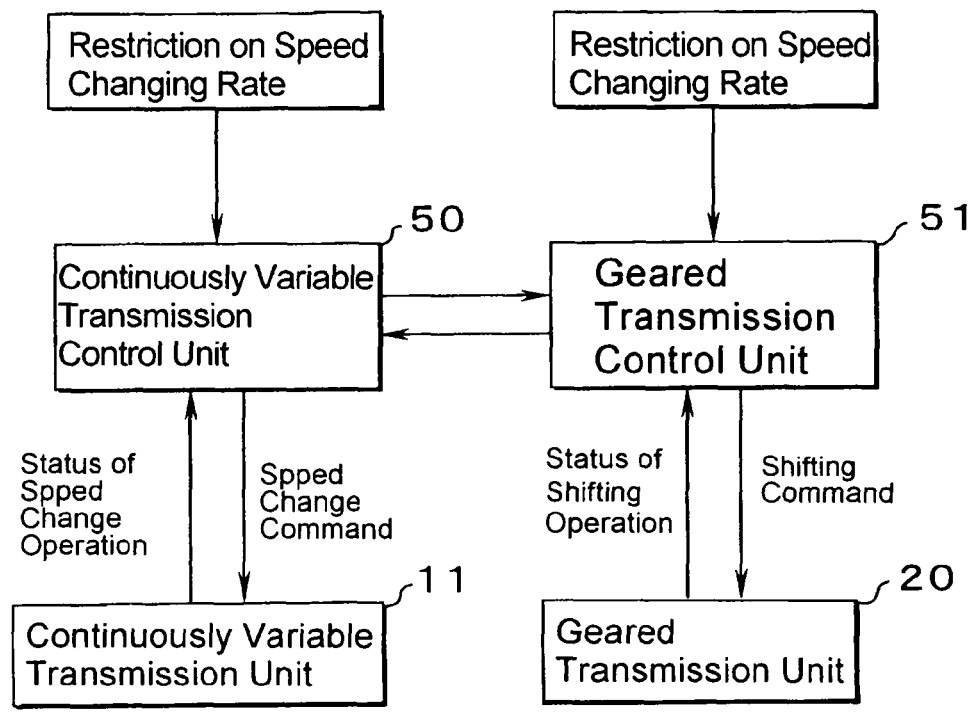
FIG. 9 is a block diagram explaining a concept of the cooperative speed change control between the geared transmission and the continuously variable transmission.

A continuously variable transmission control unit 50 shown in FIG. 9 corresponds to the controllers 31 and 32, or to a functional means of the electronic control unit 40 for controlling the controllers 31 and 32. The continuously variable transmission control unit 50 outputs a speed change command to the continuously variable transmission unit 11 to carry out a speed change operation, and detects a status of the speed change operation. Then, a feedback control to feedback the detected speed change status is carried out. On the other hand, a geared transmission control unit 51 corresponds to the hydraulic control unit 34, or to a functional means of the electronic control unit 40 for controlling the hydraulic control unit 34. The geared transmission control unit 51 outputs a shifting command to the geared transmission unit 20 to carry out a shifting operation, and detects a status of the shifting operation. Then, a feedback control to feedback the detected shifting status is carried out.

A data communication is allowed mutually between the continuously variable transmission control unit 50 and the geared transmission control unit 51. In case of carrying out a shifting operation of the geared transmission unit 20, a speed change operation of the continuously variable transmission unit 11 is basically carried out in the direction opposite to the direction of the shifting operation of the geared transmission unit 20, in order not to change the revolution frequency of the engine 8. For example, in case of carrying out a downshifting of the geared transmission unit 20 to increase a gear ratio thereof, an upshifting of the continuously variable transmission unit 11 is carried out to reduce the speed change ratio thereof in accordance with the progression of the shifting operation of the geared transmission unit 20. To the contrary, in case of carrying out an upshifting of the geared transmission unit 20 to decrease a gear ratio thereof, a downshifting of the continuously variable transmission unit 11 is carried out to increase the speed change ratio thereof in accordance with the progression of the shifting operation of the geared transmission unit 20. This kind of cooperative speed change control between the continuously variable transmission unit 11 and the geared transmission unit 20 is carried out by controlling an engaging pressure of the geared transmission unit 20 to complete the shifting operation within a target shifting time, and controlling a revolution frequency of the first electric motor M1 to carry on the speed change operation of the continuously variable transmission unit 11 in synchronism with the shifting operation of the geared transmission unit 20.

Figure 10:
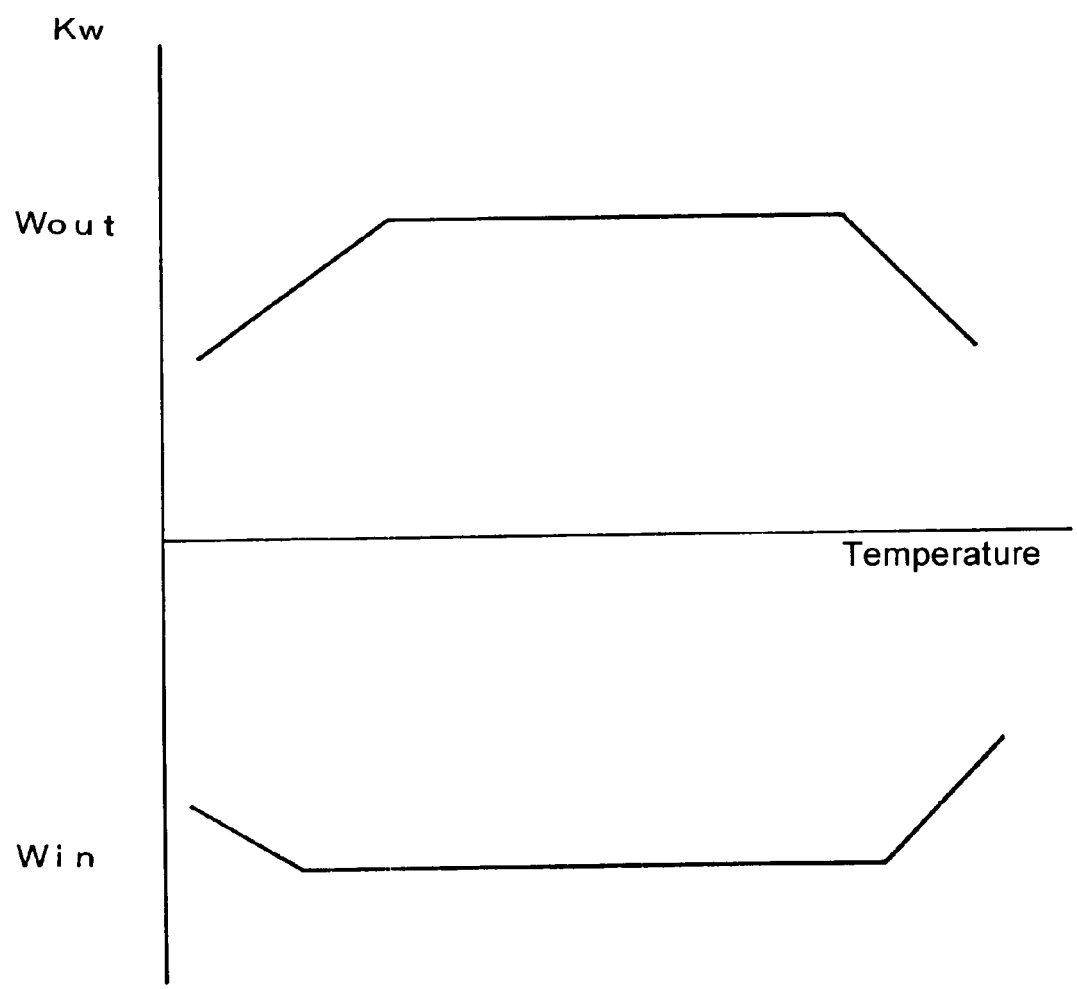
FIG. 10 is a graph schematically showing temperature characteristics of the electric storage device.

As explained with reference to FIG. 5, the speed change operation of the continuously variable transmission unit 11 is carried out by changing the revolution frequency of the first electric motor M1. Specifically, the speed change operation of the continuously variable transmission unit 11 is carried out by feeding electric power from the electric storage device 33 to the first electric motor M1, or by storing the electric power generated by the first electric motor M1 into the electric storage device 33. Therefore, in case the state of charge (SOC) of the electric storage device 33 is too low or the temperature thereof exceeds an allowable temperature range so that the electric storage device 33 cannot feed an electric power sufficiently to the first electric motor M1, or in case the electric storage device 33 is fully charged or the temperature thereof exceeds an allowable temperature range so that the electric storage device 33 cannot accept the electric power generated by the first electric motor M1, the control of the revolution frequency of the first electric motor M1 cannot be carried out as desired. An example of such case will be explained with reference to the temperature characteristic of the electric storage device 33. As indicated in FIG. 10, a capacity output of an electric power of the electric storage device 33 as represented by WOUT, and a charging capacity of the electric storage device 33 as represented by WIN are degraded gradually when the temperature of the electric storage device 33 exceeds a predetermined allowable temperature range of the electric storage device 33. On the other hand, since the shifting operation of the geared transmission unit 20 is carried out by engaging or releasing the frictional engagement devices ay an oil pressure, the shifting operation of the geared transmission unit 20 cannot be carried out as desired if a feeding or discharging of the oil pressure is delayed due to reduction in the oil temperature, or if a feeding or discharging of the oil pressure is troubled due to some trouble of the hydraulic control unit 34.

Figure 11:
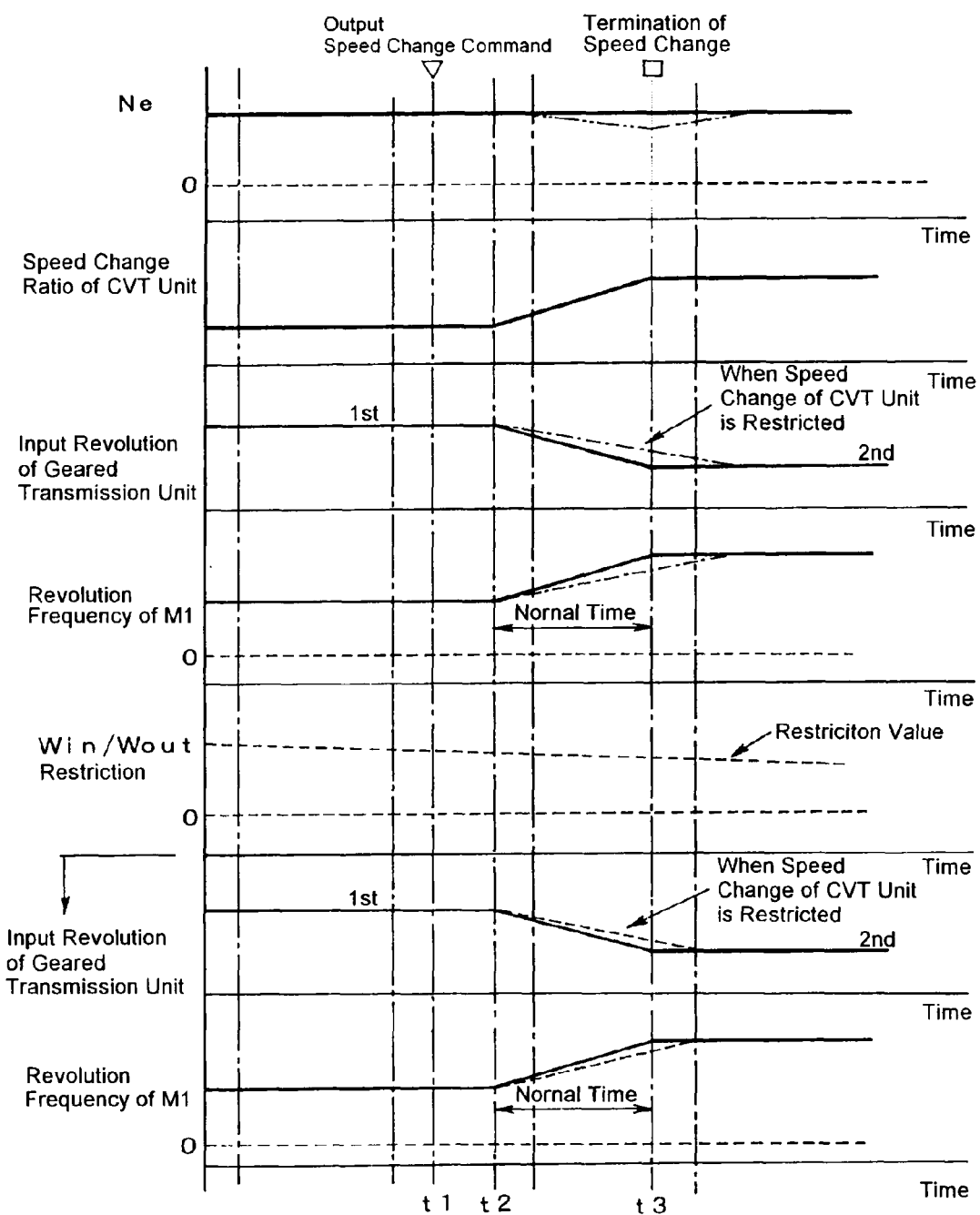
FIG. 11 is a time chart schematically showing changes in the speed change ratio and revolution frequencies under the normal speed change control and under the speed change control with restriction.

Such troubles of the state of charge of the electric storage device 33 or troubles of the engaging and releasing pressures may be a restricting factor of the speed change of the transmissions 11 and 20. An example of such a restriction of the case when carrying out a downshifting of the continuously variable transmission unit 11 will be explained hereinafter. FIG. 11 is a time chart showing changes in revolution frequencies and speed change ratios of the case when carrying out a downshifting of the continuously variable transmission unit 11 in connection with an upshifting of the geared transmission unit 20. In FIG. 11, solid lines represent the revolution frequencies and speed change ratios at the normal time or target conditions thereof. Specifically, a speed change command is outputted at a time t1. Then, at a time t2 after a lapse of predetermined time from the time t1, the revolution frequency of the first electric motor M1 is changed by a predetermined speed in response to a shifting operation of the geared transmission unit 20. As a result, the speed change ratio of the continuously variable transmission unit 11 is increased. As indicated in the nomographic diagram of FIG. 5, this is a control to increase the revolution frequency of the first sun gear S1 of the first planetary gear mechanism 24. Therefore, in consequence of the rise in the revolution frequency of the first electric motor M1, the revolution frequencies of the first ring gear R1 and the transmission member 18 connected with the first ring gear R1 are decreased. Namely, the input revolution of the geared transmission unit 20 is decreased. Such reduction in the input revolution is synchronized with the change in the revolution frequency of the geared transmission unit 20 resulting from the upshifting operation. For this reason, the revolution frequency Ne of the engine 8 is kept constant as indicated by the solid line in FIG. 11.

On the other hand, in case the change in the revolution frequency of the first electric motor M1 is delayed due to the fact that the electric storage device 33 cannot accept the electric power generated by the first electric motor M1 or the like, in short, in case the speed change of the continuously variable transmission unit 11 is restricted, the revolution frequency of the first electric motor M1 is changed as indicated by a dot-dash-line in FIG. 11. As a result, a rise in the speed change ratio of the continuously variable transmission unit 11 is delayed and the input revolution of the geared transmission unit 20 is change after a delay. In this case, the input revolution of the geared transmission unit 20 is dropped compulsory by the upshifting of the geared transmission unit 20. Therefore, the revolution frequency Ne of the engine 8 is dropped compulsory if the speed change of the continuously variable transmission unit 11 is delayed as explained above. Such condition is indicated by a dashed double-dotted line in FIG. 11. The revolution frequency Ne of the engine 8 is restored gradually to the original revolution frequency after a termination of the speed change (at a time t3). The revolution frequency Ne of the engine 8 is not changed under the normal speed change operation where there is no speed change restriction. However, in this case, since is the revolution frequency Ne of the engine 8 is thus changed, the drive torque is also changed. As a result, shocks may occur so that a passenger may by bothered by an uncomfortable feeling.

Figure 1:
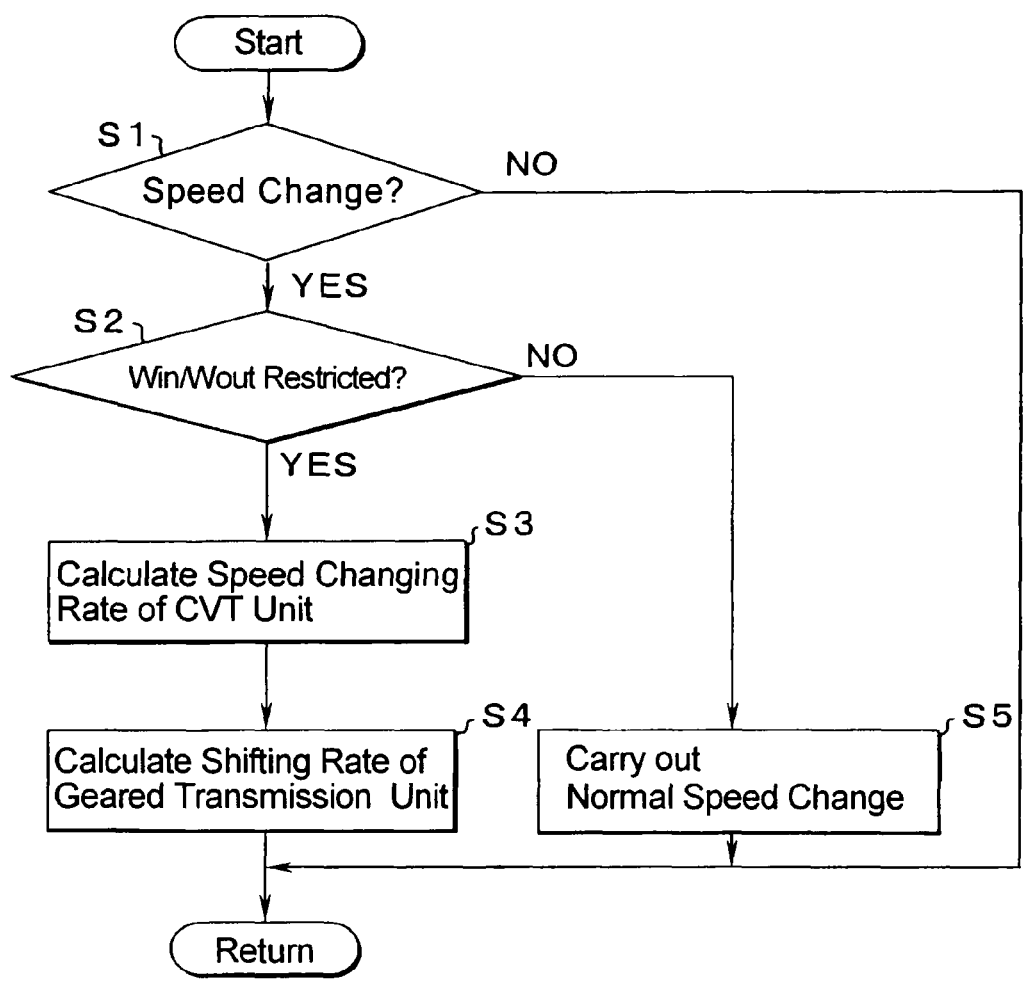
FIG. 1 is a flowchart explaining one example of the speed change control carried out by the control system of the invention.

According to the present invention, in order to avoid the aforementioned disadvantage, a control shown in FIG. 1 is carried out.

FIG. 1 is a flowchart explaining one example the control carried out by the control system of the invention. First of all, it is judged whether or not a speed change operation is being carried out (at Step S1). As explained above, the judgment of the speed change operation is satisfied by the fact that the running condition determined by an output torque demand (or an opening degree of the accelerator) and a vehicle speed is changed to exceed the gear stage regions on the shifting diagram. Therefore, the judgment at Step S1 is carried out on the basis of an existence of such a change in the shifting condition. Alternatively, the judgment at Step S1 can also be made using a control flag indicating a satisfaction of a judgment of a speed change operation.

In case the answer of Step S1 is NO, the routine is returned without carrying out any specific control. To the contrary, in case the answer of Step S1 is YES, it is judged whether or not the speed change of the continuously variable transmission unit 11 is restricted (at Step S2). For example, the restriction of the speed change is a restriction on the capacity output of an electric power WOUT of the electric storage device 33, or a restriction on the charging capacity WIN of the electric storage device 33. Also, a temperature of the electric storage device 33 may also be a factor of the restriction in addition to the state of charge (SOC). Additionally, an overheating or deterioration of the electric motors M1 and M2 may also be a restriction factor of the speed change of the continuously variable transmission unit 11.

Thus, an existence of the restriction is judged at Step S2. In case the answer of Step S2 is YES, a speed changing rate of the continuously variable transmission unit 11 is calculated (at Step S3). The transmission 10 to which the invention is applied is adapted to carry out an entire speed change operation thereof continuously, therefore, the revolution frequencies of the electric motors M1 and M2 are controlled to keep the revolution frequency Ne of the engine 8 constant when the shifting operation of the geared transmission unit 20 is started. As explained above, in case the answer of Step S2 is YES, the control of the revolution frequencies of the electric motors M1 and M2 is restricted so that the changing rates of the revolution frequencies are to be differed from at least the changing rate under the normal condition. Therefore, the changing rates of the revolution frequencies of the electric motors M1 and M2 are calculated on the basis of the control contents or the contents of the speed change operation to be executed. In other words, a feed-forward control of the electric motors M1 and M2 is carried out under the above explained restriction.

Then, a shifting rate of the geared transmission unit 20 is calculated (at Step S4), and the routine is returned. The shifting operation of the geared transmission unit 20 is controlled to be completed within a predetermined target shifting time under the normal condition where the speed change of the continuously variable transmission unit 11 is not restricted. However, in case the speed change of the continuously variable transmission unit 11 (especially the speed changing rate thereof) is restricted, a shifting rate for the shifting operation of the geared transmission unit 20 to be carried out is newly calculated. Specifically, the shifting rate according to the progression of the speed change operation of the continuously variable transmission unit 11 is calculated based on the speed changing rate of the continuously variable transmission unit 11 calculated at Step S3. Therefore, at Step S4, the shifting rate of the geared transmission unit 20 is calculated to synchronize the changing rates of the revolution frequencies of the first ring gear R1 and the transmission member 18 integrated therewith changed in consequence of changing the revolution frequency of the first electric motor M1, with the changing rate of the transmission member 18 changed in consequence of the shifting of the geared transmission unit 20. Then, a percentage of change in an engaging pressure in the geared transmission 20, specifically, a rising gradient of the oil pressure of the frictional engagement device such as the clutches and brakes is obtained to achieve the calculated shifting rate. After this, the continuously variable transmission unit 11 and the geared transmission 20 are controlled by the calculated speed changing rate and the shifting rate to execute the speed change operation of the transmission 10.

Therefore, even in case the speed change of the continuously variable transmission unit 11 is delayed by some restriction, the total speed change operation is carried out by setting the shifting rate of the geared transmission 20 to synchronize the shifting of the geared transmission 20 with the speed change of the continuously variable transmission unit 11. Specifically, the engaging pressure of the frictional engagement devices in the geared transmission 20 is changed to change the revolution frequencies of the third ring gear R3 as an input element of the geared transmission 20 and the fourth sun gear S4 integrated therewith at the rate indicated by a dot-dash-line in FIG. 11. Consequently, the revolution frequency Ne of the engine 8 can be prevented from being dropped compulsory. Therefore, deterioration in the shift shocks can be prevented or avoided.

In case the answer of Step S2 is YES, a normal speed change control is carried out (at Step S5). Specifically, the continuously variable transmission unit 11 and the geared transmission 20 are controlled to carry out a speed change operation and a shifting operation at the rates to synchronize the speed change operation and the shifting operation. This control corresponds to the control to change the revolution frequencies and the speed change ratios as indicated by the solid lined in FIG. 11.

According to the above-explained control example shown in FIG. 1, the speed changing rate of the continuously variable transmission unit 11 is calculated, and at the same time, the shifting rate of the geared transmission unit 20 is calculated to be synchronized with the speed change of the continuously variable transmission unit 11. Then, the speed change operation of the continuously variable transmission unit 11 and the shifting operation of the geared transmission unit 20 are controlled on the basis of the individual calculation results. Alternatively, according to invention, it is also possible to synchronize the speed change and the shifting operations of the continuously variable transmission unit 11 and the geared transmission unit 20 by detecting the actual speed change rate and the shifting rate of the transmission units 11 and 20, and by correcting the detected speed change rate and shifting rate. Namely, a control similar to a feedback control may also be carried out.

Figure 2:
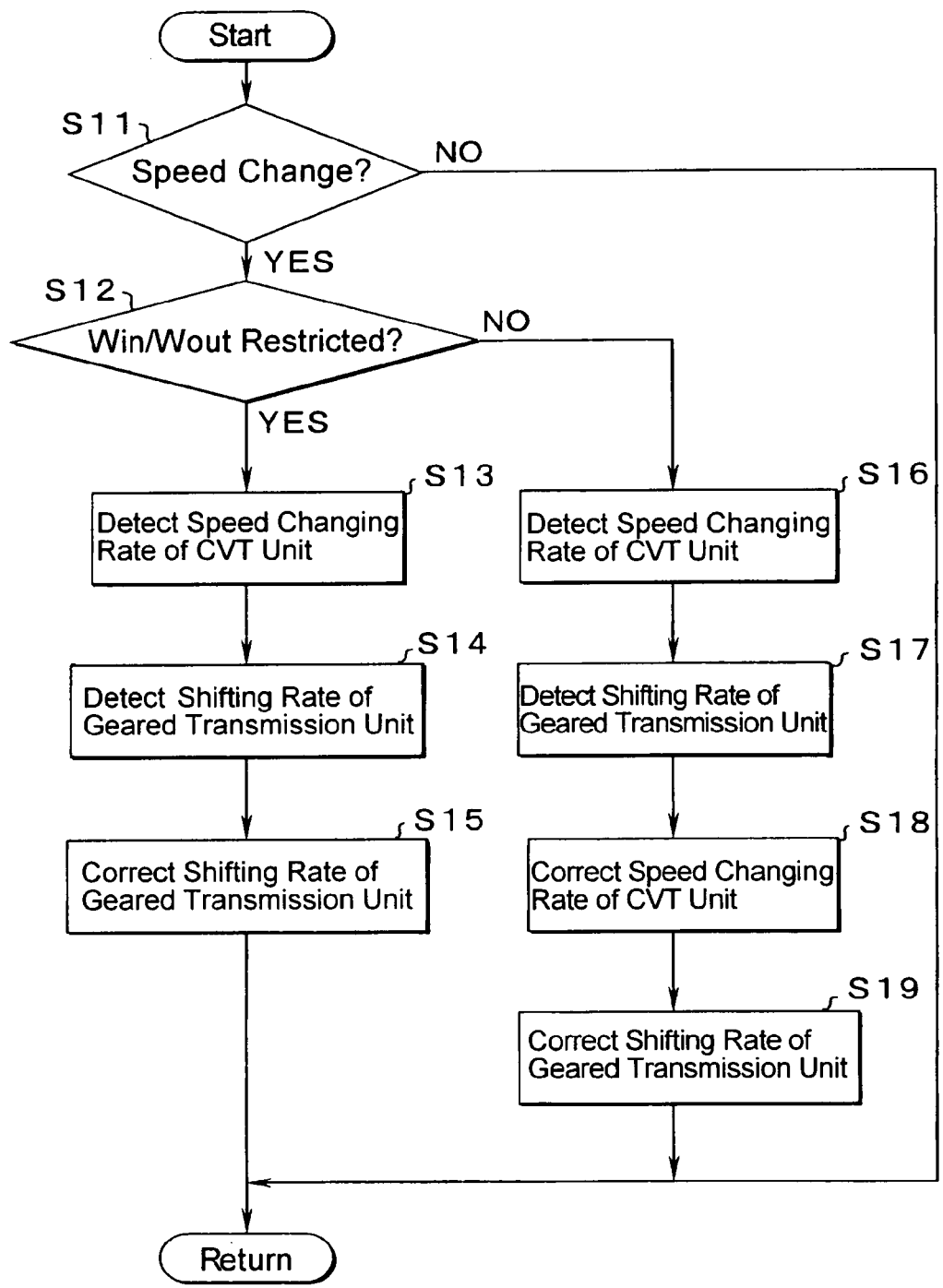
FIG. 2 is a flowchart explaining another example of the speed change control carried out by the control system of the invention.

An example of such control is shown in FIG. 2. First of all, it is judged whether or not a speed change operation is being carried out (at Step S11). The judgment carried out at Step S11 is identical to that carried out at Step S1 in FIG. 1, and the routine is returned if the answer of Step S11 is NO. To the contrary, in case the answer of Step S11 is YES, it is judged whether or not the speed change of the continuously variable transmission unit 11 is restricted (at Step S12). The judgment carried out at Step S12 is identical to that carried out at Step S2 in FIG. 1.

In case the answer of Step S12 is YES, a speed changing rate of the continuously variable transmission unit 11 is detected (at Step S13). In case the speed change of the continuously variable transmission unit 11 is restricted due to the fact that the electric power to be fed to any of the electric motors M1 and M2 is restricted or that a capacity of the electric storage device 33 to accept the electric power generated by the electric motors M1 and M2 is restricted, the speed changing rate is delayed in comparison with that under the normal condition. Therefore, an actual speed changing rate is detected at Step S13. Specifically, the actual speed changing rate can be obtained from percentages of changes in the revolution frequencies of the electric motors M1 and M2. Also, a shifting rate of the geared transmission unit 20 is detected (at Step S14). This can be detected from a rising speed of the oil pressure of the frictional engagement device involved in the shifting operation, or a percentage of change in a revolution frequency of a predetermined rotary member (e.g., the clutch or brake).

The speed changing rate and the shifting rate of the transmission units 11 and 20 are basically controlled to achieve a predetermined rate. However, if the speed changing rate of the continuously variable transmission unit 11 is restricted as explained above, the speed changing rate of the continuously variable transmission unit 11 is delayed in comparison with the shifting rate of the geared transmission 20. In this case, the speed changing rate of the continuously variable transmission unit 11 cannot be quicken to the level of the speed changing rate under the normal condition due to the restriction on the charging amount of the electric storage device 33 or the like. Therefore, the shifting rate of the geared transmission unit 20 is corrected to be synchronized with the speed changing rate of the continuously variable transmission unit 11 which is delayed due to the restriction (at Step S15).

The speed changing rate of the continuously variable transmission unit 11 and the shifting rate of the geared transmission unit 20 are thus synchronized with each other under the above explained restriction, by carrying out a feedback control of the speed changing rate and the shifting rate of the transmissions 11 and 20, specifically, the changing rate of the revolution frequency of the electric motor M1 or M2 and the rising gradient of the engaging pressure in the geared transmission 20, by feeding back the detected speed changing rate and the shifting rate. As a result, even though the speed change operation is entirely delayed, a temporal drop in the revolution frequency Ne of the engine 8 and resultant shocks can be prevented or minimized.

To the contrary, in case the answer of Step S12 is NO, specifically, in case the speed change of the continuously variable transmission unit 11 is not restricted, the speed changing rate of the continuously variable transmission unit 11 is detected (at Step S16), and the shifting rate of the geared transmission unit 20 is detected (at Step S17). Then, the speed changing rate of the continuously variable transmission unit 11 is corrected based on the difference from a target speed changing rate set in advance to synchronize the speed change thereof with the shifting of the geared transmission unit 20 (at Step S18). Subsequently, the shifting rate of the geared transmission unit 20 is corrected in the same way (at Step S19). Specifically, a feedback control to feedback the speed changing rate of the continuously variable transmission unit 11 and the shifting rate of the geared transmission unit 20 is carried out. In this case, one of the speed changing rate of the continuously variable transmission unit 11 and the shifting rate of the geared transmission unit 20 may be corrected based on the detected speed changing rate or the shifting rate of the other one. This means that it is also possible to carry out a bi-directional feedback control of changing the speed changing rate of the continuously variable transmission unit 11 and the shifting rate of the geared transmission unit 20 individually, by detecting both progression rate of the speed change operation of the continuously variable transmission unit 11 and the shifting operation of the geared transmission unit 20. Changes in the revolution frequency of the first electric motor M1 and the input revolution of the geared transmission unit 20 under the bi-directional feedback control are indicated in the lower part of FIG. 11. The speed changing rate of the continuously variable transmission unit 11 and the shifting rate of the geared transmission unit 20 can be synchronized more accurately by thus carrying out the bi-directional feedback control. Therefore, a change in the revolution frequency Ne of the engine 8 during a speed change operation and the shocks resulting from the speed change operation can be prevented or minimized more effectively.

Here, the transmission mechanism to which the invention can be applied should not be limited to the configuration illustrated in FIG. 3. That is, the present invention can also be applied to a transmission having a geared speed change unit capable of setting four forward stages. Examples are shown in FIGS. 12 to 14.

Figure 12:
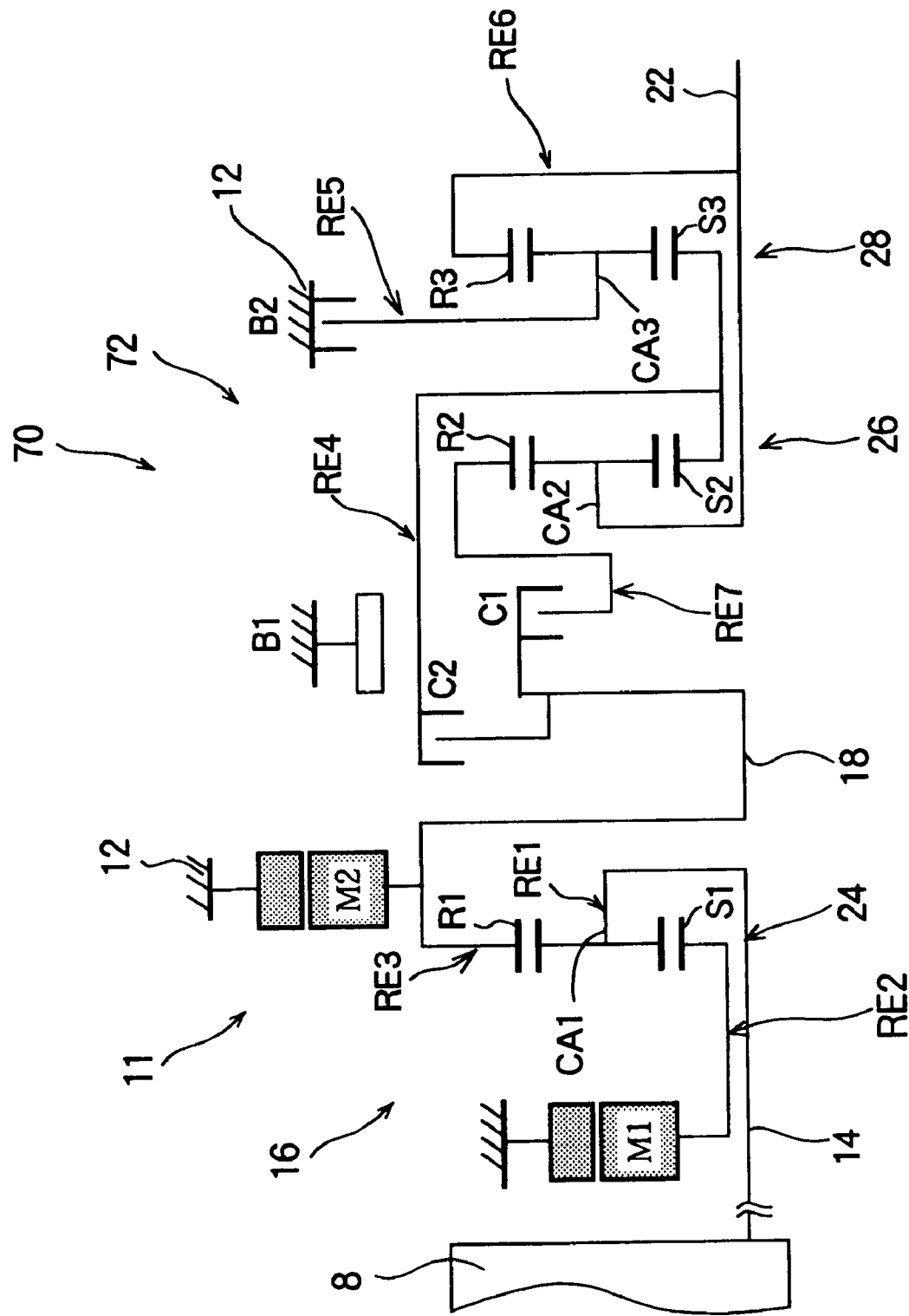
FIG. 12 is a skeleton diagram showing another example of a drive unit for a hybrid vehicle to which the invention is applied.

As the aforementioned example, the transmission 70 shown in FIG. 12 comprises: a continuously variable transmission unit 11 having a first electric motor M1, a power distribution mechanism 16, and a second electric motor M2; and a geared transmission unit 72 capable of setting three forward stages, which is connected in tandem through a transmission member 18 between the continuously variable transmission unit 11 and an output shaft 22. The power distributing mechanism 16 comprises a single pinion type first planetary gear mechanism 24 the gear ratio thereof is e.g., approximately "0.418", and it is represented by "$\rho1$". The geared transmission unit 72 comprises: a single pinion type second planetary gear mechanism 26 the gear ratio thereof is e.g., approximately "0.532", and it is represented by "$\rho2$"; and a single pinion type third planetary gear mechanism 28 the gear ratio thereof is e.g., approximately "0.418", and it is represented by "$\rho3$". A second sun gear S2 of the second planetary gear mechanism 26 and a third sun gear S3 of the third planetary gear mechanism 28 are connected integrally with each other. Those sun gears S2 and S3 are connected selectively to the transmission member 18 through a second clutch C2, and also connected selectively to a case 12 through a first brake B1. A second carrier CA2 of the second planetary gear mechanism 26 and a third ring gear R3 of the third planetary gear mechanism 28 are connected integrally with each other. Those carrier CA2 and ring gear R3 are connected to the output shaft 22. A second ring gear R2 of the second planetary gear mechanism 26 is connected selectively to the transmission member 18 through a first clutch C1, and a third carrier CA3 of the third planetary gear mechanism 28 is connected selectively to the case 12 through a second brake B2.

Figures 13, 14:
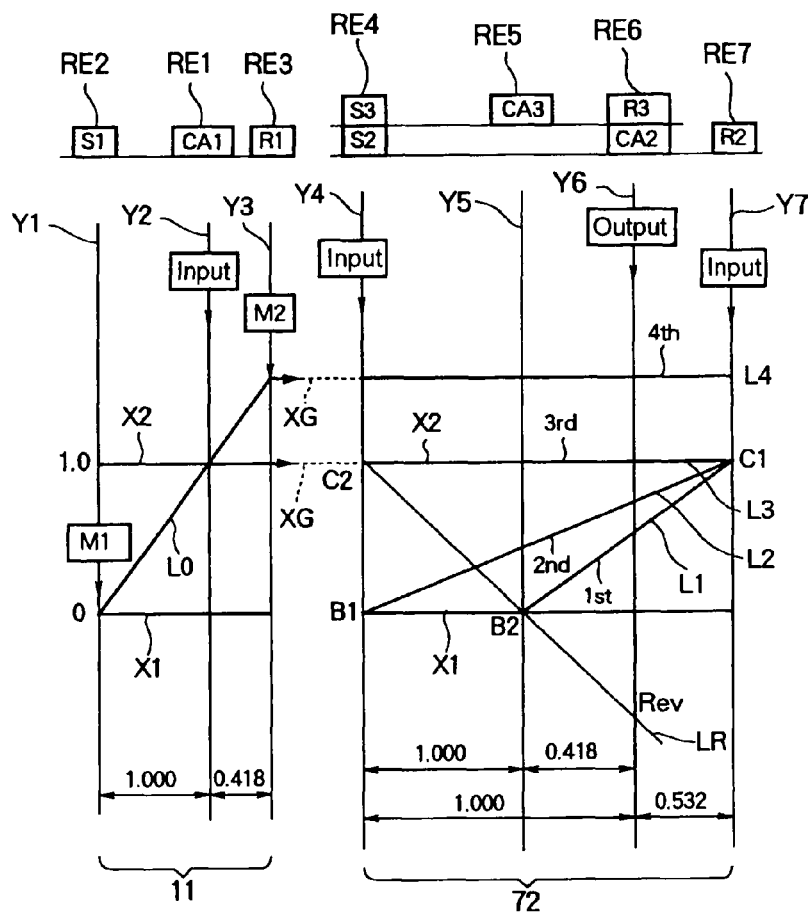
FIG. 13 is a table showing a relation between gear stages set by a geared transmission shown in FIG. 12 and engagement states of hydraulic frictional engagement devices.
FIG. 14 is a nomographic diagram explaining operating states of individual transmissions shown in FIG. 12.

According to the transmission 70 thus far explained, as indicated in the table of FIG. 13, any of a first gear stage (represented as 1st in the table) to a fourth gear stage (represented as 5th in the table), a reverse gear stage (represented as R in the table), and a neutral (represented as N in the table) are achieved by selectively activating the aforementioned elements, specifically, by selectively engaging the first clutch C1, the second clutch C2, the first brake B1, and the second brake B2. As a result, a speed change ratio Y (i.e., input shaft revolution NIN/output shaft revolution NOUT), which changes substantially in equal ratio at every gear stage is obtained.

For example, if the speed change ratio of the continuously variable transmission unit 11 is kept constant, the transmission 70 functions as a geared transmission. As shown in FIG. 13: the first gear stage where the maximum value of a speed change ratio Y1 is approximately "2.804" is achieved by engaging the first clutch C1 and the second brake B2; the second gear stage where a speed change ratio Y2 is smaller than the speed change ratio of the first gear stage, e.g., approximately "1.531" is achieved by engaging the first clutch C1 and the first brake B1; the third gear stage where a speed change ratio Y3 is smaller than the speed change ratio of the second gear stage, e.g., approximately "1.000" is achieved by engaging the first clutch C1 and the second clutch C2; and the fourth gear stage where a speed change ratio Y4 is smaller than the speed change ratio of the third gear stage, e.g., approximately "0.705" is achieved by engaging the first clutch C1 and the second clutch C2. The Reverse gear stage where a speed change ratio YR is between the speed change ratios of the first and the second gear stages, e.g., "2.393" is achieved by engaging the second clutch C2 and the second brake B2. Additionally, all of the frictional engagement devices are released to achieve Neutral.

Meanwhile, in case the transmission 70 functions as a continuously variable transmission, the continuously variable transmission unit 11 functions as a continuously variable transmission, and the geared transmission unit 72 arranged in tandem therewith functions as a geared transmission. As a result, the input revolution to the geared transmission unit 72, more specifically, the revolution frequency of the transmission member 18 to be inputted individually to the first to third gear stages of the geared transmission unit 72 is varied continuously, and the individual gear stages thereby obtain a continuous range of the speed change ratio. For this reason, the speed change ratio can be varied steplessly and continuously even between the gear stages. Consequently, a total speed change ratio YT as an entire speed change ratio of the transmission 70 can be varied steplessly.

FIG. 14 is a nomographic diagram linearly indicating a relation of revolution frequencies of the rotary elements to be connected depending on the gear stages, in the transmission 70 comprising the continuously variable transmission unit 11 functioning as a differential unit or a first transmission unit, and the geared transmission unit 72 functioning as a (an automatic) transmission unit or a second transmission unit.

In FIG. 14, four longitudinal axes Y4, Y5, Y6 and Y7 individually represents the rotary elements of the automatic transmission 72. Specifically, Y4 represents the mutually connected second sun gear S2 and third sun gear S3 corresponding to a fourth rotary element (or a fourth element) RE4, Y5 represents the third carrier CA3 corresponding to a fifth rotary element (or a fifth element) RE5, Y6 represents the mutually connected second carrier CA2 and third ring gear R3 corresponding to a sixth rotary element (or a sixth element) RE6, and Y7 represents the second ring gear R2 corresponding to a seventh rotary element (or a seventh element) RE7. In the geared transmission unit 72, the fourth rotary element RE4 is connected selectively to the transmission member 18 through the second clutch C2 and selectively to the case 12 through the first brake B1, the fifth rotary element RE5 is connected selectively to the case 12 through the second brake B2, the sixth rotary element RE6 is connected selectively to the output shaft 22 of the automatic transmission 72, and the seventh rotary element RE7 is connected selectively to the transmission member 18 through the first clutch C1.

As shown in FIG. 14, in the geared transmission unit 72, a revolution frequency of the output shaft 22 at the first gear stage is indicated at the intersection of the slant line L1 with the longitudinal axis Y6 indicating the revolution frequency of the sixth rotary element RE6 (CA2, R3) connected to the output shaft 22. Here, the line L1 is determined as a result of an engagement of the first clutch C1 and the second brake B2, and it extends from the intersection of the longitudinal axis Y7 indicating the revolution frequency of the seventh rotary element RE7 (R2) with the abscissa axis X2, to the intersection of the longitudinal axis Y5 indicating the revolution frequency of the fifth rotary element RE5 (CA3) with the abscissa axis X1. As in the case of the first gear stage: a revolution frequency of the output shaft 22 at the second gear stage is indicated at the intersection of the longitudinal axis Y6 with a slant line L2 determined as a result of engaging the first clutch C1 and the first brake B1; and a revolution frequency of the output shaft 22 at the third gear stage is indicated at the intersection of the longitudinal axis Y6 with a horizontal line L3 determined as a result of engaging the first clutch C1 and the second clutch C2. At the aforementioned first to third gear stages, the power is inputted from the continuously variable transmission unit 11 to the seventh rotary element RE7 at the revolution frequency identical to the revolution frequency Ne of the engine 8. Meanwhile, in case the first planetary gear mechanism 24 is used as a speed increasing mechanism by halting the rotation of the first sun gear S1 by the first electric motor M1, the power from the continuously variable transmission unit 11 is inputted at the revolution frequency higher than the revolution frequency NE of the engine 8. Therefore, a revolution frequency of the output shaft 22 at the fourth gear stage is indicated at the intersection of the longitudinal axis Y6 with a horizontal line L4 determined as a result of engaging the first clutch C1 and the second clutch C2.

The transmission 70 also comprises the continuously variable transmission unit 11 functioning as a differential mechanism or a first sped change unit, and the geared transmission unit 72 functioning as an automatic speed change unit or a second speed change unit. Accordingly, the advantages explained in the aforementioned example can be achieved also by this example.

Here will be explained a relation between the examples and the invention. The functional means of Step S4 shown in FIG. 1, and the functional means of Steps S15, S18 and S19 shown in FIG. 2 correspond to the speed changing rate setting means and to the speed changing rate changing means of the invention.

Here, according to the invention, the planetary gear mechanism constituting the continuously variable transmission unit may also be a double pinion type other than the single pinion type. Further, it is also possible to provide a clutch for integrating the planetary gear mechanisms, and a brake for operating the planetary gear mechanism as a speed increasing mechanism. Additionally, according to the invention, either the continuously variable transmission unit and the geared transmission unit may be arranged on the engine side.

INDUSTRIAL APPLICABILITY

The present invention can be utilized in a field of manufacturing and repairing automobiles such as cars, and in a field of manufacturing and processing parts for automobiles.

The invention claimed is:

1. A speed change control system for an automatic transmission, which has a first speed change unit and a second speed change unit, and in which a total speed change ratio thereof is varied by changing speed change ratios of the first and the second speed change units in directions opposite to each other, comprising:
   a speed changing rate setting means for setting a speed changing rate of the second speed change unit in accordance with a progression of a speed change operation of the first speed change unit.

2. The speed change control system for the automatic transmission as claimed in claim 1, wherein:
   the first speed change unit is constructed of an electrical continuously variable transmission, in which a speed change ratio thereof is controlled electrically and varied continuously; and the second speed change unit is constructed of a geared transmission in which a gear stage thereof is changed stepwise.

3. The speed change control system for the automatic transmission as claimed in claim 2, wherein:
the electrical continuously variable transmission and geared transmission are connected in tandem so as to input power outputted from any one of those transmissions to the other one.

4. The speed change control system for the automatic transmission as claimed in claim 2, wherein:
a total speed change ratio of the automatic transmission is set by both of the electrical continuously variable transmission and the geared transmission.

5. The speed change control system for the automatic transmission as claimed in claim 2:
wherein the electrical continuously variable transmission comprises an electric motor having a generating function, and a speed change ratio thereof is set in accordance with a revolution frequency of the electric motor;
comprising an electric storage device feeding an electric power to the electric motor and storing an electric power generated by the electric motor; and
wherein the speed changing rate of the electrical continuously variable transmission is restricted by an amount of the electric power exchanged between the electric motor and the electric storage device.

6. The speed change control system for the automatic transmission as claimed in claim 2, wherein:
the geared transmission comprises engagement devices to be engaged by an oil pressure to set a gear stage, and a shifting rate thereof is controlled in accordance with an engaging pressure of the engagement devices.

7. The speed change control system for the automatic transmission as claimed in claim 2, wherein:
the electrical continuously variable transmission is composed mainly of a differential gear mechanism having: an input rotary element connected with an internal combustion engine; a reaction rotary element connected with a motor generator in which a torque and a revolution frequency thereof are controlled electrically; and an output rotary element connected with the geared transmission.

8. The speed change control system for the automatic transmission as claimed in claim 7, wherein:
the differential gear mechanism includes a single pinion planetary gear mechanism having a carrier functioning as the input rotary element, a sun gear functioning as the reaction rotary element, and a ring gear functioning as the output rotary element.

9. The speed change control system for the automatic transmission as claimed in claim 2, wherein:
the geared transmission is constructed of three sets of planetary gear mechanisms and a plurality of engagement devices.

10. The speed change control system for the automatic transmission as claimed in claim 9, wherein:
the planetary gear mechanism includes a single pinion planetary gear mechanism; sun gears of first and second planetary gear mechanisms are connected with each other; a ring gear of the first planetary gear mechanism, a carrier of the second planetary gear mechanism and a carrier of the third planetary gear mechanism are connected and those ring gear and carriers are connected with an output member; and a ring gear of the second planetary gear mechanism and a sun gear of the third planetary gear mechanism are connected with each other; and
the engagement device includes: a first clutch connecting the ring gear of the second planetary gear mechanism and the sun gear of the third planetary gear mechanism with the electrical continuously variable transmission selectively; a second clutch connecting the sun gears of the first and second planetary gear mechanisms with the electrical continuously variable transmission selectively; a first brake fixing the sun gears of the first and second planetary gear mechanisms selectively; a second brake fixing the carrier of the first planetary gear mechanism selectively; and a third brake fixing the ring gear of the third planetary gear mechanism selectively.

11. The speed change control system for the automatic transmission as claimed in claim 2, wherein:
the geared transmission is constructed of two sets of planetary gear mechanisms and a plurality of engagement devices.

12. The speed change control system for the automatic transmission as claimed in claim 11, wherein:
the planetary gear mechanism includes a single pinion planetary gear mechanism; sun gears of first and second planetary gear mechanisms are connected with each other; and a carrier of the first planetary gear mechanism and a ring gear of the second planetary gear mechanism are connected and those carrier and the ring gear are connected with an output member; and
the engagement device includes: a first clutch connecting the ring gear of the first planetary gear mechanism with the electrical continuously variable transmission selectively; a second clutch connecting the sun gears of the first and second planetary gear mechanisms with the electrical continuously variable transmission selectively; a first brake fixing the sun gears of the first and second planetary gear mechanisms selectively; and a second brake fixing the carrier of the second planetary gear mechanism selectively.

13. The speed change control system for the automatic transmission as claimed in claim 1, further comprising:
a speed change control means for carrying out a normal speed change control of determining a speed change ratio, on the basis of a running condition of a vehicle on which the automatic transmission is mounted and of a speed change diagram in which the speed change ratio is set in accordance with the running condition of the vehicle.

14. A speed change control system for an automatic transmission, which has a first speed change unit having a rotary member in which a revolution frequency thereof is changed in consequence of a speed change operation and a second speed change unit, and in which a total speed change ratio thereof is varied by changing speed change ratios of the first and the second speed change units in directions opposite to each other, comprising:
a speed changing rate changing means for changing a speed changing rate of the second speed change unit in accordance with a change in the revolution frequency of the rotary member when the revolution frequency of the rotary member is changed by a speed change operation.

15. The speed change control system for the automatic transmission as claimed in claim 14, wherein:
the first speed change unit is constructed of an electrical continuously variable transmission, in which a speed change ratio thereof is controlled electrically and varied continuously; and the second speed change unit is constructed of a geared transmission in which a gear stage thereof is changed stepwise.

16. The speed change control system for the automatic transmission as claimed in claim 15, wherein:
the electrical continuously variable transmission and geared transmission are connected in tandem so as to input power outputted from any one of those transmissions to the other one.

17. The speed change control system for the automatic transmission as claimed in claim 15, wherein:
a total speed change ratio of the automatic transmission is set by both of the electrical continuously variable transmission and the geared transmission.

18. The speed change control system for the automatic transmission as claimed in claim 15:
wherein the electrical continuously variable transmission comprises an electric motor having a generating function, and a speed change ratio thereof is set in accordance with a revolution frequency of the electric motor;
comprising an electric storage device feeding an electric power to the electric motor and storing an electric power generated by the electric motor; and
wherein the speed changing rate of the electrical continuously variable transmission is restricted by an amount of the electric power exchanged between the electric motor and the electric storage device.

19. The speed change control system for the automatic transmission as claimed in claim 15, wherein:
the geared transmission comprises engagement devices to be engaged by an oil pressure to set a gear stage, and a shifting rate thereof is controlled in accordance with an engaging pressure of the engagement devices.

20. The speed change control system for the automatic transmission as claimed in claim 15, wherein:
the electrical continuously variable transmission is composed mainly of a differential gear mechanism having: an input rotary element connected with an internal combustion engine; a reaction rotary element connected with a motor generator in which a torque and a revolution frequency thereof are controlled electrically; and an output rotary element connected with the geared transmission.

21. The speed change control system for the automatic transmission as claimed in claim 20, wherein:
the differential gear mechanism includes a single pinion planetary gear mechanism having a carrier functioning as the input rotary element, a sun gear functioning as the reaction rotary element, and a ring gear functioning as the output rotary element.

22. The speed change control system for the automatic transmission as claimed in claim 15, wherein:
the geared transmission is constructed of three sets of planetary gear mechanisms and a plurality of engagement devices.

23. The speed change control system for the automatic transmission as claimed in claim 22, wherein:
the planetary gear mechanism includes a single pinion planetary gear mechanism; sun gears of first and second planetary gear mechanisms are connected with each other; a ring gear of the first planetary gear mechanism, a carrier of the second planetary gear mechanism and a carrier of the third planetary gear mechanism are connected and those ring gear and carriers are connected with an output member; and a ring gear of the second planetary gear mechanism and a sun gear of the third planetary gear mechanism are connected with each other; and
the engagement device includes: a first clutch connecting the ring gear of the second planetary gear mechanism and the sun gear of the third planetary gear mechanism with the electrical continuously variable transmission selectively; a second clutch connecting the sun gears of the first and second planetary gear mechanisms with the electrical continuously variable transmission selectively; a first brake fixing the sun gears of the first and second planetary gear mechanisms selectively; a second brake fixing the carrier of the first planetary gear mechanism selectively; and a third brake fixing the ring gear of the third planetary gear mechanism selectively.

24. The speed change control system for the automatic transmission as claimed in claim 15, wherein:
the geared transmission is constructed of two sets of planetary gear mechanisms and a plurality of engagement devices.

25. The speed change control system for the automatic transmission as claimed in claim 24, wherein:
the planetary gear mechanism includes a single pinion planetary gear mechanism; sun gears of first and second planetary gear mechanisms are connected with each other; and a carrier of the first planetary gear mechanism and a ring gear of the second planetary gear mechanism are connected and those carrier and the ring gear are connected with an output member; and
the engagement device includes: a first clutch connecting the ring gear of the first planetary gear mechanism with the electrical continuously variable transmission selectively; a second clutch connecting the sun gears of the first and second planetary gear mechanisms with the electrical continuously variable transmission selectively; a first brake fixing the sun gears of the first and second planetary gear mechanisms selectively; and a second brake fixing the carrier of the second planetary gear mechanism selectively.

26. The speed change control system for the automatic transmission as claimed in claim 14, further comprising:
a speed change control means for carrying out a normal speed change control of determining a speed change ratio, on the basis of a running condition of a vehicle on which the automatic transmission is mounted and of a speed change diagram in which the speed change ratio is set in accordance with the running condition of the vehicle.

27. A speed change control method for an automatic transmission, which has a first speed change unit and a second speed change unit, and in which a total speed change ratio thereof is varied by changing speed change ratios of the first and the second speed change units in directions opposite to each other, comprising:
setting a speed changing rate of the second speed change unit in accordance with a progression of a speed change operation of the first speed change unit.

28. The speed change control method for the automatic transmission as claimed in claim 27, wherein:
the first speed change unit is constructed of an electrical continuously variable transmission, in which a speed change ratio thereof is controlled electrically and varied continuously; and
the second speed change unit is constructed of a geared transmission in which a gear stage thereof is changed stepwise.

29. The speed change control method for the automatic transmission as claimed in claim 28, wherein:
the electrical continuously variable transmission and geared transmission are connected in tandem so as to input power outputted from any one of those transmissions to the other one.

30. The speed change control method for the automatic transmission as claimed in claim 28, wherein:
a total speed change ratio of the automatic transmission is set by both of the electrical continuously variable transmission and the geared transmission.

31. A speed change control method for an automatic transmission, which has a first speed change unit having a rotary member in which a revolution frequency thereof is changed in consequence of a speed change operation and a second speed change unit, and in which a total speed change ratio thereof is varied by changing speed change ratios of the first and the second speed change units in directions opposite to each other, comprising:
changing a speed changing rate of the second speed change unit in accordance with a change in the revolution frequency of the rotary member when the revolution frequency of the rotary member is changed by a speed change operation.

32. The speed change control method for the automatic transmission as claimed in claim 31 wherein:
the first speed change unit is constructed of an electrical continuously variable transmission, in which a speed change ratio thereof is controlled electrically and varied continuously; and
the second speed change unit is constructed of a geared transmission in which a gear stage thereof is changed stepwise.

33. The speed change control method for the automatic transmission as claimed in claim 32, wherein:
the electrical continuously variable transmission and geared transmission are connected in tandem so as to input power outputted from any one of those transmissions to the other one.

34. The speed change control method for the automatic transmission as claimed in claim 32, wherein:
a total speed change ratio of the automatic transmission is set by both of the electrical continuously variable transmission and the geared transmission.

35. A speed change control system for an automatic transmission, which has a first speed change unit and a second speed change unit, and in which a total speed change ratio thereof is varied by changing speed change ratios of the first and the second speed change units in directions opposite to each other, comprising:
a speed changing rate setting device for setting a speed changing rate of the second speed change unit in accordance with a progression of a speed change operation of the first speed change unit.

36. A speed change control system for an automatic transmission, which has a first speed change unit having a rotary member in which a revolution frequency thereof is changed in consequence of a speed change operation and a second speed change unit, and in which a total speed change ratio thereof is varied by changing speed change ratios of the first and the second speed change units in directions opposite to each other, comprising:
a speed changing rate changing device for changing a speed changing rate of the second speed change unit in accordance with a change in the revolution frequency of the rotary member when the revolution frequency of the rotary member is changed by a speed change operation.

* * * * *